US008719878B2

(12) United States Patent
Hunter et al.

(10) Patent No.: US 8,719,878 B2
(45) Date of Patent: May 6, 2014

(54) VIDEO DISTRIBUTION SYSTEM

(75) Inventors: Charles Eric Hunter, Hilton Head Island, SC (US); Bernard L. Ballou, Jr., Raleigh, NC (US); Kelly C. Sparks, Raleigh, NC (US); John H. Hebrank, Durham, NC (US)

(73) Assignee: Ochoa Optics LLC, Las Vegas, NV (US)

( * ) Notice: Subject to any disclaimer, the term of this patent is extended or adjusted under 35 U.S.C. 154(b) by 576 days.

(21) Appl. No.: 11/469,358

(22) Filed: Aug. 31, 2006

(65) Prior Publication Data

US 2007/0186272 A1 Aug. 9, 2007

Related U.S. Application Data

(63) Continuation of application No. 09/645,087, filed on Aug. 24, 2000, now abandoned, which is a continuation-in-part of application No. 09/385,671, filed on Aug. 27, 1999, and a continuation-in-part of application No. 09/436,281, filed on Nov. 8, 1999, and a continuation-in-part of application No. 09/476,078, filed on Dec. 30, 1999, and a continuation-in-part of application No. 09/502,069, filed on Feb. 10, 2000, now Pat. No. 6,647,417, and a continuation-in-part of application No. 09/553,524, filed on Apr. 20, 2000.

(51) Int. Cl.
*H04N 7/173* (2011.01)
(52) U.S. Cl.
USPC .......................................................... 725/87
(58) Field of Classification Search
USPC ..................... 725/2, 4, 87, 89, 90, 97; 705/52
See application file for complete search history.

(56) References Cited

U.S. PATENT DOCUMENTS

| 3,373,517 A | 3/1968 | Helperin .......................... 40/491 |
| 3,376,465 A | 4/1968 | Corpew ........................... 315/10 |
| 3,848,193 A | 11/1974 | Martin et al. ................... 325/53 |
| 3,941,926 A | 3/1976 | Slobodzian et al. .......... 348/383 |
| 3,983,317 A | 9/1976 | Glorioso ................... 369/109.01 |
| 3,993,955 A | 11/1976 | Belcher et al. |
| 4,071,857 A | 1/1978 | Whitney et al. |
| 4,094,010 A | 6/1978 | Pepperl et al. ............... 369/30.1 |

(Continued)

FOREIGN PATENT DOCUMENTS

| EP | 0 683 943 B1 | 11/1995 |
| EP | 0 756 423 A1 | 1/1997 |

(Continued)

OTHER PUBLICATIONS

"Wink Television Press Room," http://www.wink.com/contents/PressReleases.shtml, downloaded and printed on May 14, 2002.

(Continued)

*Primary Examiner* — Nathan Flynn
*Assistant Examiner* — Alfonso Castro
(74) *Attorney, Agent, or Firm* — Baker & Hostetler LLP

(57) ABSTRACT

The invention relates to video distribution systems and, more particularly, to a system that blanket transmits video/audio content such as movies (for example, via satellite downlink transmission) to each customer's computer-based recording, storage and playback system. Customers preselect from a list of available movies or other content in advance using an interactive screen selector, and pay for only the video/audio content that is actually viewed.

22 Claims, 19 Drawing Sheets

(56) References Cited

U.S. PATENT DOCUMENTS

| | | | |
|---|---|---|---|
| 4,155,042 A | 5/1979 | Permut et al. .................. 340/7.5 |
| 4,230,990 A | 10/1980 | Lert et al. |
| 4,332,022 A | 5/1982 | Ceshkovsky et al. ...... 369/44.28 |
| 4,368,485 A | 1/1983 | Midland ....................... 348/799 |
| 4,476,488 A | 10/1984 | Merrell .......................... 725/33 |
| 4,536,791 A | 8/1985 | Campbell et al. ............... 725/28 |
| 4,554,584 A | 11/1985 | Elam et al. |
| 4,559,480 A | 12/1985 | Nobs ............................. 315/324 |
| 4,575,750 A | 3/1986 | Callahan ........................ 725/34 |
| 4,595,950 A | 6/1986 | Lofberg ........................ 380/202 |
| 4,613,901 A | 9/1986 | Gilhousen et al. |
| 4,654,482 A | 3/1987 | DeAngelis ................ 379/93.12 |
| 4,716,410 A | 12/1987 | Nozaki .................... 340/825.52 |
| 4,734,779 A | 3/1988 | Levis et al. ................... 348/383 |
| 4,734,858 A | 3/1988 | Schlafly ......................... 705/26 |
| 4,761,641 A | 8/1988 | Schreiber ...................... 345/1.3 |
| 4,766,581 A | 8/1988 | Korn et al. |
| 4,789,863 A | 12/1988 | Bush ............................. 340/5.9 |
| 4,794,465 A | 12/1988 | Van Luyt et al. ............. 386/100 |
| 4,797,913 A | 1/1989 | Kaplan et al. ............... 379/91.02 |
| 4,809,325 A | 2/1989 | Hayashi et al. ............... 380/234 |
| 4,812,843 A | 3/1989 | Champion, III et al. ...... 340/905 |
| 4,829,569 A | 5/1989 | Seth-Smith et al. .......... 380/234 |
| 4,845,700 A | 7/1989 | Koizumi et al. |
| 4,847,825 A | 7/1989 | Levine ....................... 369/47.23 |
| 4,862,268 A | 8/1989 | Campbell et al. ............. 348/463 |
| 4,908,713 A | 3/1990 | Levine ........................... 386/83 |
| 4,949,187 A | 8/1990 | Cohen ........................... 386/69 |
| 5,046,090 A | 9/1991 | Walker et al. ................. 380/202 |
| 5,051,822 A | 9/1991 | Rhoades ......................... 463/25 |
| 5,073,925 A | 12/1991 | Nagata et al. ................... 360/60 |
| 5,105,418 A | 4/1992 | Kenmotsu et al. |
| 5,107,107 A | 4/1992 | Osborne ................. 250/231.14 |
| 5,121,430 A | 6/1992 | Ganzer et al. ................. 380/258 |
| 5,123,046 A | 6/1992 | Levine ........................... 380/242 |
| 5,133,079 A | 7/1992 | Ballantyne et al. ............ 725/146 |
| 5,182,669 A | 1/1993 | Chikuma et al. .............. 359/241 |
| 5,191,573 A | 3/1993 | Hair ............................... 369/84 |
| 5,214,793 A | 5/1993 | Conway et al. ............... 455/500 |
| 5,233,423 A | 8/1993 | Jernigan et al. ............... 348/564 |
| 5,235,587 A | 8/1993 | Bearden et al. ............ 210/198.2 |
| 5,251,193 A | 10/1993 | Nelson et al. .............. 369/44.12 |
| 5,257,017 A | 10/1993 | Jones et al. ...................... 345/13 |
| 5,260,778 A | 11/1993 | Kauffman et al. ............... 725/33 |
| 5,274,762 A | 12/1993 | Peterson et al. ............... 709/219 |
| 5,283,731 A | 2/1994 | LaLonde et al. .................. 705/1 |
| 5,292,568 A | 3/1994 | Tezuka et al. |
| 5,297,204 A | 3/1994 | Levine ........................... 380/242 |
| 5,311,423 A | 5/1994 | Clark .............................. 705/8 |
| 5,319,735 A | 6/1994 | Preuss et al. .................. 704/205 |
| 5,355,302 A | 10/1994 | Martin et al. .................. 700/234 |
| 5,365,282 A | 11/1994 | Levine ........................... 348/734 |
| 5,373,330 A | 12/1994 | Levine ........................... 348/734 |
| 5,387,942 A | 2/1995 | Lemelson |
| 5,393,993 A | 2/1995 | Edmond et al. |
| 5,410,344 A | 4/1995 | Graves et al. |
| 5,414,756 A | 5/1995 | Levine ....................... 379/88.23 |
| 5,418,713 A | 5/1995 | Allen ............................. 705/32 |
| 5,420,647 A | 5/1995 | Levine ........................... 348/734 |
| 5,420,923 A | 5/1995 | Beyers, II et al. ............. 380/234 |
| 5,428,606 A | 6/1995 | Moskowitz .................... 370/400 |
| 5,438,355 A | 8/1995 | Palmer ........................... 725/110 |
| 5,440,334 A | 8/1995 | Walters et al. |
| 5,465,291 A | 11/1995 | Barrus et al. ................ 379/67.1 |
| 5,469,020 A | 11/1995 | Herrick ......................... 313/511 |
| 5,469,206 A | 11/1995 | Strubbe et al. .................. 725/60 |
| 5,473,584 A | 12/1995 | Oshima ..................... 369/47.11 |
| 5,483,278 A | 1/1996 | Strubbe et al. .................. 725/61 |
| 5,483,535 A | 1/1996 | McMillen et al. ............. 370/452 |
| 5,486,819 A | 1/1996 | Horie ............................. 340/905 |
| 5,495,283 A | 2/1996 | Cowe .............................. 725/33 |
| 5,497,186 A | 3/1996 | Kawasaki ........................ 725/34 |
| 5,497,479 A | 3/1996 | Hornbuckle .................... 463/29 |
| 5,508,815 A | 4/1996 | Levine ........................... 386/83 |
| 5,512,935 A | 4/1996 | Majeti et al. .................... 725/33 |
| 5,513,260 A | 4/1996 | Ryan ............................. 380/200 |
| 5,530,751 A | 6/1996 | Morris ........................... 380/202 |
| 5,532,920 A | 7/1996 | Hartrick et al. ............... 715/500 |
| 5,543,856 A | 8/1996 | Rosser et al. .................. 348/578 |
| 5,545,454 A | 8/1996 | Yamada et al. |
| 5,550,863 A | 8/1996 | Yurt et al. ..................... 375/240 |
| 5,557,541 A | 9/1996 | Schulhof et al. ............... 700/94 |
| 5,559,549 A * | 9/1996 | Hendricks et al. ............. 725/50 |
| 5,565,909 A | 10/1996 | Thibadeau et al. .............. 725/35 |
| 5,566,315 A | 10/1996 | Milillo et al. .................. 711/113 |
| 5,568,272 A | 10/1996 | Levine ............................ 386/48 |
| 5,572,442 A | 11/1996 | Schulhof et al. ............... 709/219 |
| 5,592,511 A | 1/1997 | Schoen et al. ................. 375/220 |
| 5,592,551 A | 1/1997 | Lett et al. ...................... 380/211 |
| 5,592,626 A | 1/1997 | Papadimitriou et al. ...... 718/102 |
| 5,598,397 A | 1/1997 | Sim |
| 5,600,839 A | 2/1997 | MacDonald .................. 713/322 |
| 5,610,653 A | 3/1997 | Abecassis ...................... 348/170 |
| 5,612,741 A | 3/1997 | Loban et al. .................. 348/383 |
| 5,619,247 A * | 4/1997 | Russo ........................... 725/104 |
| 5,621,840 A | 4/1997 | Kawamura et al. ............ 386/68 |
| 5,621,863 A | 4/1997 | Boulet et al. .................. 706/26 |
| 5,627,895 A | 5/1997 | Owaki ............................ 380/54 |
| 5,628,050 A | 5/1997 | McGraw et al. ............. 455/12.1 |
| 5,630,067 A | 5/1997 | Kindell et al. ................. 709/231 |
| 5,638,113 A | 6/1997 | Lappington et al. ........... 725/141 |
| 5,640,453 A | 6/1997 | Schuchman et al. .......... 380/211 |
| 5,644,859 A | 7/1997 | Hsu ................................ 40/545 |
| 5,646,603 A | 7/1997 | Nagata et al. ............. 340/825.25 |
| 5,646,997 A | 7/1997 | Barton ........................... 713/176 |
| 5,654,747 A | 8/1997 | Ottesen et al. ...................... 725/1 |
| 5,659,366 A | 8/1997 | Kerman ......................... 725/34 |
| 5,659,613 A | 8/1997 | Copeland et al. ............. 380/202 |
| 5,661,516 A | 8/1997 | Carles ............................ 725/35 |
| 5,664,018 A | 9/1997 | Leighton ......................... 380/54 |
| 5,675,734 A | 10/1997 | Hair ............................... 705/26 |
| 5,682,206 A | 10/1997 | Wehmeyer et al. ............. 725/58 |
| 5,684,918 A | 11/1997 | Abecassis ........................ 386/83 |
| 5,686,954 A | 11/1997 | Yoshinobu et al. ............ 725/43 |
| 5,689,799 A | 11/1997 | Dougherty et al. .......... 455/2.01 |
| 5,692,214 A | 11/1997 | Levine ........................... 710/13 |
| 5,701,161 A | 12/1997 | Williams et al. .............. 348/468 |
| 5,701,383 A | 12/1997 | Russo et al. .................... 386/46 |
| 5,701,397 A | 12/1997 | Steimle et al. .................. 706/41 |
| 5,710,869 A | 1/1998 | Godefray et al. ............... 706/41 |
| 5,717,814 A | 2/1998 | Abecassis ...................... 386/46 |
| 5,717,832 A * | 2/1998 | Steimle et al. .................. 706/33 |
| 5,721,827 A | 2/1998 | Logan et al. .................. 709/217 |
| 5,721,951 A | 2/1998 | DorEl ............................. 710/10 |
| 5,724,062 A | 3/1998 | Hunter .......................... 345/102 |
| 5,724,091 A | 3/1998 | Freeman et al. ............... 725/138 |
| 5,724,525 A | 3/1998 | Beyers, II et al. .............. 705/40 |
| 5,729,214 A | 3/1998 | Moore .......................... 340/905 |
| 5,729,516 A | 3/1998 | Tozaki et al. |
| 5,734,413 A | 3/1998 | Lappington et al. .......... 725/141 |
| 5,734,720 A | 3/1998 | Salganicoff ................... 380/211 |
| 5,734,781 A | 3/1998 | Cantone ........................ 386/46 |
| 5,740,326 A | 4/1998 | Boulet et al. ................. 706/27 |
| 5,745,569 A | 4/1998 | Moskowitz et al. |
| 5,748,716 A | 5/1998 | Levine ...................... 379/102.03 |
| 5,758,257 A | 5/1998 | Herz et al. ...................... 725/116 |
| 5,760,820 A | 6/1998 | Eda et al. ........................ 725/33 |
| 5,761,606 A | 6/1998 | Wolzien ......................... 725/110 |
| 5,761,721 A | 6/1998 | Baldus et al. .................. 711/141 |
| 5,771,334 A | 6/1998 | Yamauchi et al. |
| 5,781,734 A | 7/1998 | Ohno et al. .................... 725/115 |
| 5,790,202 A | 8/1998 | Kummer et al. .............. 348/553 |
| 5,790,935 A | 8/1998 | Payton ........................... 422/186 |
| 5,790,937 A | 8/1998 | Gutle ............................. 725/135 |
| 5,799,285 A | 8/1998 | Klingman ....................... 705/26 |
| 5,805,154 A | 9/1998 | Brown .......................... 715/717 |
| 5,805,763 A | 9/1998 | Lawler et al. .................. 386/83 |
| 5,809,139 A | 9/1998 | Girod et al. ................... 380/202 |
| 5,815,484 A | 9/1998 | Smith et al. |
| 5,815,662 A | 9/1998 | Ong ............................... 725/92 |
| 5,818,806 A | 10/1998 | Wong et al. ................ 369/53.33 |
| 5,822,291 A | 10/1998 | Brindze et al. .................. 369/94 |
| 5,822,432 A | 10/1998 | Moskowitz et al. ............. 380/28 |
| 5,825,407 A | 10/1998 | Cowe et al. ................... 725/143 |

(56) References Cited

U.S. PATENT DOCUMENTS

| | | | |
|---|---|---|---|
| 5,826,123 A | 10/1998 | Lai | 396/446 |
| 5,828,402 A | 10/1998 | Collings | |
| RE35,954 E | 11/1998 | Levine | 380/242 |
| 5,832,287 A | 11/1998 | Atalla | 709/231 |
| 5,835,896 A | 11/1998 | Fisher et al. | 705/37 |
| 5,841,979 A | 11/1998 | Schulhof et al. | 709/237 |
| 5,845,083 A | 12/1998 | Hamadani et al. | 709/231 |
| 5,848,129 A | 12/1998 | Baker | 379/67.1 |
| 5,848,155 A | 12/1998 | Cox | 382/191 |
| 5,848,352 A | 12/1998 | Dougherty et al. | 725/110 |
| 5,854,779 A | 12/1998 | Johnson et al. | 369/59.18 |
| 5,857,020 A | 1/1999 | Peterson, Jr. | 705/52 |
| 5,860,068 A | 1/1999 | Cook | 705/26 |
| 5,862,260 A | 1/1999 | Rhoads | 382/232 |
| 5,870,717 A | 2/1999 | Wiecha | 705/26 |
| 5,874,985 A | 2/1999 | Matthews, III | 725/32 |
| 5,878,017 A | 3/1999 | Ikegame | |
| 5,884,284 A | 3/1999 | Peters et al. | 705/30 |
| 5,889,868 A | 3/1999 | Moskowitz et al. | 713/176 |
| 5,890,136 A | 3/1999 | Kipp | 705/22 |
| 5,897,622 A | 4/1999 | Blinn et al. | 705/26 |
| 5,898,384 A | 4/1999 | Alt et al. | 340/825.36 |
| 5,899,980 A | 5/1999 | Wilf et al. | 705/26 |
| 5,903,262 A | 5/1999 | Ichihashi et al. | |
| 5,903,878 A | 5/1999 | Talati | 705/26 |
| 5,905,713 A | 5/1999 | Anderson et al. | 370/241 |
| 5,905,800 A | 5/1999 | Moskowitz et al. | 380/28 |
| 5,909,492 A | 6/1999 | Payne et al. | 705/78 |
| 5,914,712 A | 6/1999 | Sartain et al. | |
| 5,914,774 A | 6/1999 | Ota | |
| 5,915,018 A | 6/1999 | Aucsmith | 380/201 |
| 5,915,027 A | 6/1999 | Cox et al. | 380/54 |
| 5,915,068 A | 6/1999 | Levine | 386/83 |
| 5,918,213 A | 6/1999 | Bernard et al. | 705/26 |
| 5,926,230 A * | 7/1999 | Niijima et al. | 725/56 |
| 5,930,369 A | 7/1999 | Cox et al. | 380/54 |
| 5,931,901 A | 8/1999 | Wolfe et al. | 709/206 |
| 5,933,499 A * | 8/1999 | Enari | 380/217 |
| 5,933,798 A | 8/1999 | Linnartz | 702/191 |
| 5,934,795 A | 8/1999 | Rykowski et al. | 362/309 |
| 5,940,135 A | 8/1999 | Petrovic et al. | 348/473 |
| 5,940,807 A | 8/1999 | Purcell | 705/26 |
| 5,943,670 A | 8/1999 | Prager | 707/5 |
| 5,946,665 A | 8/1999 | Suzuki et al. | 705/26 |
| 5,949,885 A | 9/1999 | Leighton | 380/54 |
| 5,956,716 A | 9/1999 | Kenner et al. | 707/10 |
| 5,959,885 A | 9/1999 | Rao | 365/185.07 |
| 5,959,945 A | 9/1999 | Kleiman et al. | 381/81 |
| 5,960,081 A | 9/1999 | Vynne et al. | 713/176 |
| 5,960,411 A | 9/1999 | Hartman et al. | 705/26 |
| 5,963,217 A | 10/1999 | Grayson et al. | 345/473 |
| 5,963,264 A | 10/1999 | Jackson | 348/460 |
| 5,963,915 A | 10/1999 | Kirsch | 705/26 |
| 5,963,917 A | 10/1999 | Ogram | 705/26 |
| 5,966,440 A | 10/1999 | Hair | 705/26 |
| 5,966,697 A | 10/1999 | Fergerson et al. | 705/26 |
| 5,969,283 A | 10/1999 | Looney et al. | 84/609 |
| 5,969,715 A | 10/1999 | Dougherty et al. | 725/110 |
| 5,970,471 A | 10/1999 | Hill | 705/26 |
| 5,970,472 A | 10/1999 | Allsop et al. | 705/26 |
| 5,970,473 A | 10/1999 | Gerszberg et al. | 705/26 |
| 5,970,474 A | 10/1999 | Leroy et al. | 705/27 |
| 5,970,475 A | 10/1999 | Barnes et al. | 705/27 |
| 5,974,396 A | 10/1999 | Anderson et al. | 705/10 |
| 5,978,775 A | 11/1999 | Chen | 705/26 |
| 5,983,199 A | 11/1999 | Kaneko | 705/26 |
| 5,983,200 A | 11/1999 | Slotznick | 705/26 |
| 5,983,201 A | 11/1999 | Fay | 705/27 |
| 5,988,078 A | 11/1999 | Levine | 715/721 |
| 5,991,399 A | 11/1999 | Graunke et al. | 380/4 |
| 5,992,888 A | 11/1999 | North et al. | 283/56 |
| 6,002,772 A | 12/1999 | Saito | 705/58 |
| 6,005,938 A | 12/1999 | Banker et al. | 380/239 |
| 6,006,332 A | 12/1999 | Rabne et al. | 713/201 |
| 6,011,722 A | 1/2000 | Bude et al. | |
| 6,012,086 A | 1/2000 | Lowell | 709/218 |
| 6,013,007 A | 1/2000 | Root et al. | 482/8 |
| 6,014,491 A | 1/2000 | Hair | 386/31 |
| 6,023,451 A | 2/2000 | Kashiwagi et al. | |
| 6,025,868 A | 2/2000 | Russo | |
| 6,029,045 A | 2/2000 | Picco et al. | 725/34 |
| 6,029,141 A | 2/2000 | Bezos et al. | 725/27 |
| 6,032,130 A | 2/2000 | Alloul et al. | 705/27 |
| 6,041,316 A | 3/2000 | Allen | |
| 6,044,047 A | 3/2000 | Kulas | 369/34.01 |
| 6,052,554 A | 4/2000 | Hendricks et al. | 725/109 |
| 6,061,440 A | 5/2000 | Delaney et al. | 379/202.01 |
| 6,064,980 A | 5/2000 | Jacobi et al. | 705/26 |
| 6,067,107 A | 5/2000 | Travaille et al. | 725/24 |
| 6,067,532 A | 5/2000 | Gebb | 705/37 |
| 6,069,868 A | 5/2000 | Kashiwagi | 369/275.1 |
| 6,072,982 A | 6/2000 | Haddad | |
| 6,073,372 A | 6/2000 | Davis | 40/124.16 |
| 6,081,785 A | 6/2000 | Oshima et al. | 705/1 |
| 6,088,455 A | 7/2000 | Logan et al. | 380/200 |
| 6,088,722 A | 7/2000 | Herz et al. | 709/217 |
| 6,091,883 A | 7/2000 | Artigalas et al. | 386/83 |
| 6,112,192 A | 8/2000 | Capek | |
| 6,115,348 A | 9/2000 | Guerra | 369/112.26 |
| 6,118,976 A * | 9/2000 | Arias et al. | 725/118 |
| 6,119,096 A | 9/2000 | Mann et al. | 705/5 |
| 6,122,403 A | 9/2000 | Rhoads | |
| 6,131,130 A | 10/2000 | Van Ryzin | |
| 6,141,530 A | 10/2000 | Rabowsky | 725/116 |
| 6,147,715 A | 11/2000 | Yuen et al. | 348/565 |
| 6,148,033 A * | 11/2000 | Pearlstein et al. | 375/240.16 |
| 6,148,142 A | 11/2000 | Anderson | 386/125 |
| 6,148,428 A | 11/2000 | Welch et al. | 714/752 |
| 6,150,964 A | 11/2000 | McLaughlin | 341/59 |
| 6,151,600 A | 11/2000 | Dedrick | 707/10 |
| 6,175,840 B1 | 1/2001 | Chen et al. | 707/501.1 |
| 6,177,931 B1 | 1/2001 | Alexander et al. | 725/52 |
| 6,198,875 B1 | 3/2001 | Edenson et al. | 386/94 |
| 6,201,777 B1 | 3/2001 | Tsuchiya et al. | |
| 6,209,787 B1 | 4/2001 | Iida | 235/381 |
| 6,226,618 B1 | 5/2001 | Downs et al. | 705/1 |
| 6,228,440 B1 | 5/2001 | Dailey et al. | |
| 6,229,453 B1 | 5/2001 | Gardner et al. | 340/853.8 |
| 6,233,389 B1 | 5/2001 | Barton et al. | 386/46 |
| 6,233,682 B1 | 5/2001 | Fritsch | 713/168 |
| 6,236,760 B1 * | 5/2001 | Bagni et al. | 382/248 |
| 6,238,763 B1 | 5/2001 | Sandstrom | |
| 6,240,401 B1 | 5/2001 | Oren et al. | 705/40 |
| 6,243,350 B1 | 6/2001 | Knight et al. | |
| 6,247,047 B1 | 6/2001 | Wolff | |
| 6,247,130 B1 | 6/2001 | Fritsch | 713/171 |
| 6,249,532 B1 | 6/2001 | Yoshikawa et al. | 370/486 |
| 6,265,424 B1 | 7/2001 | Tisdell et al. | 546/272.4 |
| 6,269,394 B1 | 7/2001 | Kenner et al. | 709/217 |
| 6,272,636 B1 | 8/2001 | Neville et al. | 713/189 |
| 6,288,753 B1 | 9/2001 | DeNicola et al. | |
| 6,297,859 B1 | 10/2001 | George | |
| 6,317,164 B1 * | 11/2001 | Hrusecky et al. | 348/581 |
| 6,343,738 B1 | 2/2002 | Ogilvie | |
| 6,363,356 B1 | 3/2002 | Horstmann | 705/26 |
| 6,385,596 B1 | 5/2002 | Wiser et al. | 705/51 |
| 6,400,996 B1 | 6/2002 | Hoffberg et al. | 700/83 |
| 6,405,203 B1 | 6/2002 | Collart | 707/10 |
| 6,408,313 B1 | 6/2002 | Campbell et al. | 707/205 |
| 6,424,998 B2 | 7/2002 | Hunter | 709/207 |
| 6,430,603 B2 | 8/2002 | Hunter | 709/207 |
| 6,430,605 B2 | 8/2002 | Hunter | 709/207 |
| 6,438,579 B1 | 8/2002 | Hosken | 709/203 |
| 6,453,420 B1 | 9/2002 | Collart | 726/26 |
| 6,456,331 B2 | 9/2002 | Kwoh | 348/465 |
| 6,463,467 B1 | 10/2002 | Mages et al. | 709/218 |
| 6,493,874 B2 | 12/2002 | Humpleman | 725/78 |
| 6,496,822 B2 | 12/2002 | Rosenfelt et al. | 707/9 |
| 6,504,798 B1 | 1/2003 | Revis | 369/30.23 |
| 6,510,177 B1 * | 1/2003 | De Bonet et al. | 375/240.16 |
| 6,519,341 B1 | 2/2003 | Enari | 380/217 |
| 6,519,571 B1 | 2/2003 | Guheen et al. | |
| 6,522,769 B1 | 2/2003 | Rhoads et al. | 382/100 |
| 6,529,526 B1 | 3/2003 | Schneidewend | |

(56) References Cited

U.S. PATENT DOCUMENTS

| | | | |
|---|---|---|---|
| 6,549,719 B2 | 4/2003 | Mankovitz | 386/83 |
| 6,574,424 B1 | 6/2003 | Dimitri et al. | |
| 6,604,240 B2 | 8/2003 | Ellis et al. | 725/45 |
| 6,606,744 B1 | 8/2003 | Mikurak | 717/174 |
| 6,611,820 B2 | 8/2003 | Gotoh et al. | 705/56 |
| 6,621,933 B2 | 9/2003 | Oshima et al. | 382/233 |
| 6,625,333 B1 * | 9/2003 | Wang et al. | 382/300 |
| 6,637,029 B1 | 10/2003 | Maissel et al. | |
| 6,641,886 B1 | 11/2003 | Bakos et al. | |
| 6,647,417 B1 | 11/2003 | Hunter et al. | 709/225 |
| 6,662,231 B1 | 12/2003 | Drosset et al. | |
| 6,681,326 B2 | 1/2004 | Son et al. | 713/150 |
| 6,697,948 B1 | 2/2004 | Rabin et al. | 726/30 |
| 6,708,157 B2 | 3/2004 | Stefik et al. | 705/59 |
| 6,718,551 B1 | 4/2004 | Swix et al. | 725/32 |
| 6,728,271 B1 | 4/2004 | Kawamura et al. | |
| 6,728,713 B1 | 4/2004 | Beach et al. | 707/10 |
| 6,732,366 B1 | 5/2004 | Russo | 725/5 |
| 6,735,251 B2 * | 5/2004 | Sugahara | 375/240.01 |
| 6,756,997 B1 | 6/2004 | Ward et al. | |
| 6,760,442 B1 | 7/2004 | Scott | |
| 6,769,020 B2 | 7/2004 | Miyazaki et al. | 709/219 |
| 6,772,331 B1 | 8/2004 | Hind et al. | |
| 6,778,678 B1 | 8/2004 | Podilchuk et al. | |
| 6,783,886 B1 | 8/2004 | Hunter et al. | |
| 6,792,007 B1 | 9/2004 | Hamada et al. | |
| 6,799,326 B2 | 9/2004 | Boylan et al. | |
| 6,810,131 B2 | 10/2004 | Nakagawa et al. | |
| 6,829,301 B1 | 12/2004 | Tinker et al. | 375/240.12 |
| 6,829,368 B2 | 12/2004 | Meyer et al. | 382/100 |
| 6,842,522 B1 | 1/2005 | Downing | |
| 6,850,901 B1 | 2/2005 | Hunter et al. | 705/26 |
| 6,881,465 B2 | 4/2005 | Ogawa et al. | |
| 6,889,383 B1 | 5/2005 | Jarman | |
| 6,928,423 B1 | 8/2005 | Yamanaka | 705/50 |
| 6,931,534 B1 * | 8/2005 | Jandel et al. | 713/176 |
| 6,931,657 B1 | 8/2005 | Marsh | 725/46 |
| 6,944,600 B2 | 9/2005 | Stefik et al. | 705/51 |
| 6,948,070 B1 | 9/2005 | Ginter et al. | 713/193 |
| 6,952,685 B1 | 10/2005 | Hunter et al. | 705/58 |
| 6,956,833 B1 | 10/2005 | Yukie et al. | 370/328 |
| 6,959,220 B1 | 10/2005 | Wiser et al. | |
| 6,990,678 B2 | 1/2006 | Zigmond | 725/109 |
| 6,999,946 B2 | 2/2006 | Nuttall | 705/57 |
| 7,006,974 B2 | 2/2006 | Burchard et al. | |
| 7,032,237 B2 | 4/2006 | Tsunoda et al. | |
| 7,039,684 B2 | 5/2006 | Blockton et al. | 709/226 |
| 7,047,302 B1 | 5/2006 | Chatani et al. | |
| 7,120,800 B2 | 10/2006 | Ginter et al. | 713/193 |
| 7,130,892 B2 | 10/2006 | Mukai | 705/26 |
| 7,155,733 B2 | 12/2006 | Rodriguez et al. | |
| 7,169,334 B2 | 1/2007 | Yamamoto et al. | |
| 7,191,153 B1 | 3/2007 | Braitberg et al. | |
| 7,197,758 B1 | 3/2007 | Blackketter et al. | |
| 7,209,900 B2 | 4/2007 | Hunter et al. | 705/1 |
| 7,233,781 B2 | 6/2007 | Hunter et al. | 455/404.1 |
| 7,263,188 B2 | 8/2007 | Kohno | 380/231 |
| 7,263,497 B1 | 8/2007 | Wiser et al. | |
| 7,269,634 B2 | 9/2007 | Getsin et al. | |
| 7,313,802 B1 | 12/2007 | Tomsen | |
| 7,370,016 B1 | 5/2008 | Hunter et al. | |
| 7,428,639 B2 * | 9/2008 | Demos | 713/176 |
| 7,487,128 B2 | 2/2009 | Spagna et al. | |
| 7,499,564 B2 | 3/2009 | Rhoads | |
| 7,539,110 B2 | 5/2009 | Mizuno et al. | |
| 2001/0003846 A1 | 6/2001 | Rowe et al. | 725/47 |
| 2001/0013037 A1 | 8/2001 | Matsumoto | 707/5 |
| 2001/0013120 A1 | 8/2001 | Tsukamoto | 725/5 |
| 2001/0016836 A1 | 8/2001 | Boccon-Gibod et al. | 705/51 |
| 2001/0018742 A1 | 8/2001 | Hirai | 713/193 |
| 2001/0018858 A1 | 9/2001 | Dwek | 84/609 |
| 2001/0023416 A1 | 9/2001 | Hosokawa | 705/51 |
| 2001/0023417 A1 | 9/2001 | Stefik et al. | 705/57 |
| 2001/0025259 A1 | 9/2001 | Rouchon | 705/26 |
| 2001/0025269 A1 | 9/2001 | Otsuka | 705/52 |
| 2001/0025316 A1 | 9/2001 | Oh | 709/231 |
| 2001/0027561 A1 | 10/2001 | White et al. | 725/1 |
| 2001/0027563 A1 | 10/2001 | White et al. | 725/46 |
| 2001/0029491 A1 | 10/2001 | Yoneta et al. | 705/53 |
| 2001/0029583 A1 | 10/2001 | Palatov et al. | 713/193 |
| 2001/0030660 A1 | 10/2001 | Zainoulline | 715/720 |
| 2001/0032131 A1 | 10/2001 | Mowry | 705/14 |
| 2001/0032132 A1 | 10/2001 | Moran | 705/14 |
| 2001/0032133 A1 | 10/2001 | Moran | 705/14 |
| 2001/0032312 A1 | 10/2001 | Runje et al. | 713/172 |
| 2001/0034635 A1 | 10/2001 | Winters | 705/10 |
| 2001/0034714 A1 | 10/2001 | Terao et al. | 705/57 |
| 2001/0037465 A1 * | 11/2001 | Hart et al. | 713/201 |
| 2001/0042043 A1 | 11/2001 | Shear et al. | 705/51 |
| 2001/0047298 A1 | 11/2001 | Moore et al. | 705/14 |
| 2002/0028024 A1 * | 3/2002 | Jayant et al. | 382/243 |
| 2002/0056112 A1 | 5/2002 | Dureau et al. | 725/78 |
| 2002/0056118 A1 | 5/2002 | Hunter et al. | 725/87 |
| 2002/0057799 A1 | 5/2002 | Kohno | |
| 2002/0066025 A1 | 5/2002 | Sato et al. | 713/200 |
| 2002/0095357 A1 | 7/2002 | Hunter et al. | 705/27 |
| 2002/0100043 A1 | 7/2002 | Lowthert et al. | 725/36 |
| 2002/0103699 A1 | 8/2002 | Figueiras Ferreiro | |
| 2002/0112235 A1 | 8/2002 | Ballou et al. | 725/89 |
| 2002/0112243 A1 | 8/2002 | Hunter et al. | 725/133 |
| 2002/0120925 A1 | 8/2002 | Logan | |
| 2002/0124251 A1 | 9/2002 | Hunter et al. | 725/42 |
| 2002/0184047 A1 | 12/2002 | Plotnick et al. | |
| 2003/0004796 A1 | 1/2003 | Struble | |
| 2003/0028888 A1 | 2/2003 | Hunter et al. | 725/55 |
| 2003/0036974 A1 | 2/2003 | Allen | |
| 2003/0061607 A1 | 3/2003 | Hunter et al. | 725/32 |
| 2003/0067554 A1 | 4/2003 | Klarfeld et al. | |
| 2003/0133692 A1 | 7/2003 | Hunter | 386/35 |
| 2004/0083492 A1 | 4/2004 | Goode et al. | 725/87 |
| 2004/0103439 A1 | 5/2004 | Macrae et al. | 725/109 |
| 2005/0010949 A1 | 1/2005 | Ward et al. | 725/42 |
| 2005/0097599 A1 | 5/2005 | Plotnick et al. | 725/32 |
| 2005/0182730 A1 | 8/2005 | Hunter et al. | 705/58 |
| 2006/0195548 A1 | 8/2006 | Hunter et al. | 709/217 |
| 2006/0212892 A1 | 9/2006 | Hunter et al. | 725/87 |
| 2006/0212908 A1 | 9/2006 | Hunter et al. | 725/86 |
| 2006/0225332 A1 | 10/2006 | Zenisek | |
| 2006/0229904 A1 | 10/2006 | Hunter et al. | 705/52 |
| 2006/0294016 A1 | 12/2006 | Hunter et al. | 705/51 |
| 2007/0028276 A1 | 2/2007 | Inoue et al. | |
| 2007/0110240 A1 | 5/2007 | Moskowitz et al. | |
| 2007/0186272 A1 | 8/2007 | Hunter et al. | 725/87 |
| 2007/0234391 A1 | 10/2007 | Hunter et al. | |
| 2007/0276740 A1 | 11/2007 | Hunter et al. | |
| 2009/0099968 A1 | 4/2009 | Hunter et al. | |

FOREIGN PATENT DOCUMENTS

| | | |
|---|---|---|
| EP | 0 942 417 A2 | 3/1999 |
| EP | 0 954 176 A2 | 11/1999 |
| EP | 0 954 179 A2 | 11/1999 |
| EP | 0 975 111 A2 | 1/2000 |
| EP | 0 977 389 A2 | 2/2000 |
| EP | 0 984 631 A1 | 3/2000 |
| EP | 0 994 470 A2 | 4/2000 |
| EP | 1 252 732 B1 | 1/2001 |
| EP | 1 104 195 A2 | 5/2001 |
| EP | 1 143 721 A1 | 10/2001 |
| EP | 1 226 715 B1 | 4/2008 |
| JP | 360253082 | 12/1985 |
| JP | 407143081 A | 6/1995 |
| JP | 410290441 | 10/1998 |
| JP | 11 150517 A | 6/1999 |
| JP | 11 163811 A | 6/1999 |
| JP | 11 231077 A | 8/1999 |
| JP | 11 259764 A | 9/1999 |
| JP | 11 331 839 A | 11/1999 |
| JP | 11 331 150 A | 11/1999 |
| JP | 2002015333 | 1/2002 |
| JP | 2002099283 | 4/2002 |
| JP | 2002156979 | 5/2002 |
| TW | 503657 | 8/2000 |
| TW | 527835 | 3/2001 |

(56) References Cited

FOREIGN PATENT DOCUMENTS

| | | |
|---|---|---|
| WO | WO 91/03112 | 3/1991 |
| WO | WO 92/22983 | 12/1992 |
| WO | WO 94/13107 | 6/1994 |
| WO | WO 96/26605 | 8/1996 |
| WO | WO 96/34467 | 10/1996 |
| WO | WO 96/34494 | 10/1996 |
| WO | WO 98/26357 | 6/1998 |
| WO | WO 98/27732 | 6/1998 |
| WO | WO 99/18518 | 4/1999 |
| WO | WO 99/18727 | 4/1999 |
| WO | WO 99/31842 | 6/1999 |
| WO | WO 01/01677 | 1/2000 |
| WO | WO 00/05886 | 2/2000 |
| WO | WO 00/07368 | 2/2000 |
| WO | WO 00/14965 | 3/2000 |
| WO | WO 01/17242 | 3/2001 |
| WO | WO 01/41013 | 6/2001 |
| WO | WO 01/47249 | 6/2001 |
| WO | WO 01/54324 | 7/2001 |
| WO | WO 01/54410 | 7/2001 |
| WO | WO 01/74050 | 10/2001 |
| WO | WO 01/82625 | 11/2001 |
| WO | WO 02/65750 | 8/2002 |

OTHER PUBLICATIONS

"Wink Announces First National Advertising Partners: AT&T, Levi Strauss & Co., and GE," http://www.wink.com/contents/PressReleases/930708938/content.shtml, downloaded and printed on May 14, 2002, dated Sep. 9, 1998.
"Wink Communications, Inc., Changes the Advertising Landscape," http://www.wink.com/contents/PressReleases/930709807/content.shtml, downloaded and printed on May 14, 2002, dated Jan. 21, 1999.
"Wink's History," http://www.wink.com/contents/history.shtml, downloaded and printed on May 14, 2002.
"How Wink Works," http://www.wink.com/contents/howitworks.shtml, downloaded and printed on May 14, 2002.
"What is Wink: Examples," http://www.wink.com/contents/examples.shtml, downloaded and printed on May 14, 2002.
"The Wink System." http://www.wink.com/contents/tech_diagram.shtml, downloaded and printed on May 14, 2002.
"Wink Response Server and Wink Response Network," http://www.wink.com/contents/tech_wrs.shtml, downloaded and printed on May 14, 2002.
"ICAP and HTML (ATVEF)," http://www.wink.com/contents/tech_icap.shtml. downloaded and printed on May 14, 2002.
"Wink Studio and Wink Server Studio," http://www.wink.com/contents/tech_studio.shtml, downloaded and printed on May 14, 2002.
"Wink Broadcast Server," http://www.wink.com/contents/tech_wbs.shtml, downloaded and printed on May 14, 2002.
"Wink Client Software," http://www.wink.com/contents/tech_engine.shtml, downloaded and printed on May 14, 2002.
"DataPlay, Inc.—Universal Recording Media—Discover," http://www/dataplay.com/jsp_files/en/discover/index-music.jsp, downloaded and printed on May 14, 2002, (Copyright 2001).
"DataPlay, Inc.—Universal Recording Media—What's Playing on DataPlay," http://www/dataplay.com/servlets/ProductList?action=productSearch, downloaded and printed on May 14, 2002, (Copyright 2001).
"DataPlay, Inc.—Universal Recording Media—What's Playing on DataPlay," http://www.dataplay.com/jsp_files/en/whatsplaying/products.jsp, downloaded and printed on May 14, 2002, (Copyright 2001).
"DataPlay, Inc.—Universal Recording Media—What's Playing on DataPlay," http://www.dataplay.com/jsp_files/en/whatsplaying/products.jsp?action=details, downloaded and printed on May 14, 2002, (Copyright 2001).
"DataPlay, Inc.—Universal Recording Media—Industry," http://www.dataplay.com/jsp_files/en/industry/products-digitalmedia.jsp, downloaded and printed on May 14, 2002. (Copyright 2001).
"DataPlay, Inc.—Universal Recording Media—Industry," http://www.dataplay.com/jsp_files/en/industry/products-engines.jsp, downloaded and printed on May 14, 2002. (Copyright 2001).
"DataPlay, Inc.—Universal Recording Media—Industry," http://www.dataplay.com/jsp_files/en/industry.contentproviders.jsp, downloaded and printed on May 14, 2002. (Copyright 2001).
"DataPlay, Inc.—Universal Recording Media—Industry," http://www.dataplay.com/jsp_files/en/industry/products-contentkey.jsp, downloaded and printed on May 14, 2002. (Copyright 2001).
"DataPlay, Inc.—Universal Recording Media—Industry," http://www.dataplay.com/jsp_files/en/industry/index.jsp, downloaded and printed on May 14, 2002. (Copyright 2001).
"What's Playing on DataPlay—Everything Digital," DataPlay Micro-optical Engine Product Brochure, downloaded and printed on May 14, 2002, (Copyright 2000-2002).
"What's Playing on DataPlay—Everything Digital," DataPlay Digital Media Product Brochure, downloaded and printed on May 14, 2002, (Copyright 2000-2001).
"Internet Archive Way Back Machine—Searched for http://www.egghead.com," printed Apr. 8, 2002. (Copyright 2001).
"Internet Archive Way Back Machine—Searched for http://www.onsale.com," printed Apr. 8, 2002, (Copyright 2001).
"Calimetrics' Multilevel Technology Enables Higher-Performance CD/DVD Recorders: An IDC White Paper," Wolfgang Schlichting, (Copyright 2000).
"Making Digital Cinema Actually Happen—What it Takes and Who's Going to Do It," Steven A Morley, (Copyright 1998).
"Streaming Onto the Movie Screen, with Nary a Scratch," Karen J. Bannan, The New York Times, May 9, 2002, p. E5.
IBM Technical Disclosure Bulletin, "Multimedia Audio on Demand," 1994, 37, 1 page (Abstract only).
U.S. Appl. No. 09/385,671 Charles Eric Hunter (filed Aug. 27, 1999).
U.S. Appl. No. 09/476,078 Charles Eric Hunter (filed Dec. 30, 1999).
U.S. Appl. No. 09/493,854 Charles Eric Hunter et al. (filed Jan. 28, 2000).
U.S. Appl. No. 09/553,524 Charles Eric Hunter et al. (filed Apr. 20, 2000).
U.S. Appl. No. 09/645,087 Charles Eric Hunter et al. (filed Aug. 24, 2000).
U.S. Appl. No. 09/675,025 Charles Eric Hunter et al. (filed Sep. 28, 2000).
U.S. Appl. No. 09/684,442 Charles Eric Hunter et al. (filed Oct. 6, 2000).
U.S. Appl. No. 09/707,273 Charles Eric Hunter et al. (filed Nov. 6, 2000).
U.S. Appl. No. 11/469,236 Charles Eric Hunter et al. (filed Aug. 31, 2006).
U.S. Appl. No. 11/801,109 Charles Eric Hunter et al. (filed May 7, 2007).
Connell, N., "Conference on Lasers and Electro-Optics: Perspectives on Printing, Storage and Display," 1996 Tech Digest Series, vol. 9.
Tsuchiya et al., "High Density Digital Videodics Using 635 nm Laser Diode," IEEE, Aug. 1994, 6 pages.
Sennaroglu et al., "Generation of Tunable Femtosecond Pulses in the 1.21-1.27 um and 605-635 nm Wavelength Region by Using a regenertively Initiated Self-Mode-Locked Cr: Forsterite Laser," IEEE, Aug. 1994, 11 pages.
U.S. Appl. No. 60/169,274, pp. 1-45, filed Dec. 7, 1999, 109 pages.
U.S. Appl. No. 09/707,273, filed Nov. 6, 2000 Hunter et al, 62 pages.
"Circuit City's DIVX Format Bites the Dust!" published Jun. 21, 1999; source: www.hometheater.about.com.
DVD-Video Format Book Specification, Version 1.11, published Mar. 1999 by Toshiba Corporation on behalf of DVD forum.
United States Patent and Trademark Office: Non-Final Office Action dated Jan. 12, 2009, U.S. Appl. No. 11/361,115.
United States Patent and Trademark Office: Final Office Action dated Sep. 3, 2009, U.S. Appl. No. 11/361,115.
U.S. Appl. No. 11/468,959, filed Aug. 31, 2006 by Charles Eric Hunter et al.
U.S. Appl. No. 11/468,963, filed Aug. 31, 2006 by Charles Eric Hunter et al.
U.S. Appl. No. 11/468,969, filed Aug. 31, 2006 by Charles Eric Hunter et al.

(56) References Cited

OTHER PUBLICATIONS

U.S. Appl. No. 11/469,292, filed Aug. 31, 2006 by Charles Eric Hunter et al.
U.S. Appl. No. 10/243,826, filed Sep. 16, 2002 by Charles Eric Hunter et al.
U.S. Appl. No. 11/469,130, filed Aug. 31, 2006 by Charles Eric Hunter et al.
U.S. Appl. No. 11/469,319, filed Aug. 31, 2006 by Charles Eric Hunter et al.
PCT International Preliminary Examination Report received Aug. 3, 2001, in corresponding International Application No. PCT/US00/23410.
PCT International Search Report mailed Nov. 28, 2000, in corresponding International Application No. PCT/US00/23410.
Communication by the Examining Division dated Jul. 29, 2005, in corresponding EP application No. 009594300.
Communication: Supplementary EP Search Report dated Apr. 18, 2005, in corresponding EP application No. 009594300.
PCT International Preliminary Examination Report received Feb. 4, 2002, in corresponding International Application No. PCT/US01/01979.
PCT International Search Report mailed May 17, 2001, in corresponding International Application No. PCT/US01/01979.
Communication by the Examining Division dated Mar. 22, 2004, in corresponding EP application No. 019031848.
PCT International Preliminary Examination Report received Jun. 3, 2002, in corresponding International Application No. PCT/US01/05675.
PCT International Search Report mailed Aug. 28, 2001, in corresponding International Application No. PCT/US01/05675.
Williams, "MP3 All in One", Newsbytes, Jul. 23, 1999, 1 page.
US 5,825,354, 10/1998, Ahmad et al. (withdrawn)

* cited by examiner

| SLOT | PROGRAM |
|---|---|
| 1 | Blank Disc |
| 2 | "Return of the Jedi" |
| 3 | No Disc |
| 4 | "To Sir with Love" |
| 5 | Blank Disc |
| 6 | "Sleepless in Seattle" |
| 7 | "Dave" |
| 8 | Blank Disc |
| 9 | No Disc |
| 10 | "True Grit" |

| New Releases/Comedy (20 Titles) | | | |
|---|---|---|---|
| 1 | Title #1 | 120 mins. | PG |
| 2 | Title #2 | 98 mins. | R |
| 3 | Title #3 | 102 mins. | PG-13 |
| 4 | Title #4 | 108 mins. | PG |
| 5 | | | |
| 6 | | | |
| 7 | | | |
| 8 | | | |

LEVEL I TIME-BASED SECURITY CODES

| A | B | C |
|---|---|---|
| One 32 bit code in each movie header X 12 months X 100 years = 1200 32 bit codes. | One 32 bit code for each month chosen at the beginning of each month and transmitted by DBS. | One 32 bit code delivered each month by phone/modem with billing query from central controller system. C provided only when customer is in good standing. |

FIG. 8

| Step | Mode Name | Description | Hardware Involved |
|---|---|---|---|
|  | Account Setup | Happens when customer buys and hooks up The user station. |  |
| 1 | Selection | Customer looks at recently updated "catalog' of available movie selections on his TV using the graphical user interface. Use remote to page through information. | User station, remote, customer TV, stored catalog |
| 2 | Ordering | Customer uses user station, remote and TV screen to order | User station, remote, customer TV |
| 3 | Downloading | Movies are downloaded during transmission hours as encrypted, compressed files through customer's satellite dish to hard disk in user station. | User station, satellite receiver |
| 4 | Viewing | Customer plays movie directly from hard drive with decryption/decompressing in real time. | User station, customer TV and speakers |
| 5 | Billing | Customer's account billed later by modem or Internet communication with central controller. | User station |
| 6 | Optional "Library" Movie Delivery | Full-quality movie on selected medium (e.g. DVD) that can be played on any DVD player is burned with watermark. | User station, DVD burner |

Fig. 12

| SELECT MOVIE TYPE PREFERENCES |  |
|---|---|
| Action | Documentaries |
| Romantic Comedy | Foreign Language |
| Science Fiction | Musicals |
| Combat | Westerns |
| Animated | Political |
| Family (G) | Suspense |

Fig. 13

| SECOND LEVEL MOVIE PREFERENCES | | | |
|---|---|---|---|
| Favorite Movie Stars (Male) | Favorite Movie Stars (Female) | Favorite Directors | Preferred Rating(s) |
| Mel Gibson<br>Tom Hanks<br>↓ | Julia Roberts<br>Meg Ryan<br>↓ | George Lucas<br>John Doe<br>↓ | G<br>PG<br>PG-13<br>R<br>X |

Fig. 14

DNA Pattern Library

| Frame Group 1 | Frame Group 2 | Frame Group 3 | ...... | Frame Group n |
|---|---|---|---|---|
| Pattern 1<br>Pattern 2<br>Pattern 3<br>•<br>•<br>•<br>Pattern N | Pattern 1<br>Pattern 2<br>Pattern 3<br>•<br>•<br>•<br>Pattern N | Pattern 1<br>Pattern 2<br>Pattern 3<br>•<br>•<br>•<br>Pattern N | | Pattern 1<br>Pattern 2<br>Pattern 3<br>•<br>•<br>•<br>Pattern N |

Figure 21

Video Content File

- Required Frame Groups: 1, 4, 7, 9, ... n
- Additional Patterns to be Added to DNA Library Groups
- Highly Compressed/Noise Added Video File

Figure 22

VIDEO DISTRIBUTION SYSTEM

CROSS REFERENCE TO RELATED APPLICATIONS

This application is a continuation of U.S. application Ser. No. 09/645,087, filed Aug. 24, 2000, now abandoned. U.S. Application Ser. No. 09/645,087 is a continuation-in-part of U.S. application Ser. No. 09/502,069, filed Feb. 10, 2000, now U.S. Pat. 6,647,417, and a continuation-in-part of U.S. application Ser. No. 09/553,524, filed Apr. 20, 2000, now pending. U.S. application Ser. No. 09/553,524 is a continuation-in-part of U.S. application Ser. No. 09/476,078, filed Dec. 30, 1999, now pending, a continuation-in-part of U.S. application No. Ser. 09/436,281, filed Nov. 8, 1999, now pending; and a continuation-in-part of U.S. application Ser. No. 09/385,671, filed Aug. 27, 1999, now abandoned.

FIELD OF THE INVENTION

The invention relates to video distribution systems and, more particularly, to a system that blanket transmits video/audio content such as movies (for example, via satellite downlink transmission) to each customer's computer-based recording, storage and playback system. Customers preselect from a list of available movies or other content in advance using an interactive screen selector, and pay for only the video/audio content that is actually viewed.

DESCRIPTION OF THE PRIOR ART

Widespread home television viewing began in approximately 1950 with broadcast networks transmitting shows on specific, prepublished schedules. This model remained the primary model for television viewing for over thirty years.

Cable, and later direct broadcast satellite, increased the number of channels. But viewers were still subject to programming schedules.

Video cassette recorders offered the prospect of shifting viewing times, provided the end user was one of the thirty percent or less of VCR owners who learned to program their VCR's. Even among those who learned to program their VCR, time shifting via VCR remains subject to properly setting up the timer, assuring the power is in the correct state, assuring that a correct tape is in the VCR, that the tape is not full, that the tape is properly rewound, etc. Thus, for the majority of TV viewers, even at the turn of the century, the TV viewing model has scarcely changed from the mode of 1950.

Video rental stores have provided a sort of "video on demand" subject, of course, to the high cost of video cassette purchases by the rental stores, as well as the high capital outlay for real estate (land and building) and the cost of labor at the stores. Even when a title becomes available through video release, the viewer's ability to watch the show at his chosen time is subject to availability of the video at the store, round-trip transportation to the store and the inevitable problems with late returns, damaged videos, lost videos, etc.

True video-on-demand has been envisioned whereby massive video servers would be positioned in every geographic location to transfer high speed video data streams to the houses of individual viewers at any time a viewer wished to access a particular movie or other content. However, this type of video demand system, after years and billions of dollars of investment, has proven to be too complex and expensive and, therefore, has not been implemented.

A compromise on the video-on-demand concept has been proposed by Replay Networks, Inc. (USA) whereby viewers create their own "replay channels" containing content categorized by, for example, show titles, actor, movie type, etc., with such programming being recorded on hard disks at a local facility and later available for on-demand access by individual viewers. Another type of on-demand video distribution system is described in U.S. Pat. No. 5,832,287, whereby video-on-demand and network programming is provided from master file and network program databases through multiple community systems, each of which may serve up to approximately one hundred homes.

Both the Replay Networks, Inc. and the '287 systems have severe limitations in terms of storage capability and customer options.

An interactive viewing system that automatically records selected programs is disclosed in U.S. Pat. No. 5,805,763. However, the '763 system simply provides another mechanism for recording television programs. This system attempts to simplify the VCR recording function, but because of its complex nature and limited benefits it has not been implemented.

There is an acute need in the video distribution industry for a system that will provide each individual viewer with ready access to thousands of movies titles, as well as educational programming, network programming, audio programming and the like, in a convenient low-cost manner that fully satisfies user demand, while enhancing the economic incentives of content providers to create and distribute an ever expanding offering of movies and other video/audio content.

SUMMARY OF THE INVENTION

The present invention provides a video distribution system that is beneficial to all involved parties, namely consumers, content providers and data transmission providers. In preferred embodiments, consumers are able to preselect movies for viewing from as many as one to eight thousand movies or more that are transmitted daily and as many as ten to sixty thousand movies or more transmitted monthly. Customers of the video distribution system utilize a menu driven, graphical user interface with simplified controls that provide movie selection by title, type, category (e.g., comedy new releases from major studios). In preferred embodiments, video/audio content is blanket transmitted via direct broadcast satellite (DBS) in an encoded, compressed form for playback at VHS resolution (or other desired resolution). The transmission is directly to each customer's receiving dish or antenna which is linked to the customer's user station where selected movies are stored on DVD RAM discs or CD's in a multiple disc platter, or on a hard drive having a storage capacity of, for example, 20 gigabytes or more. The movies may then be played immediately or at any time desired by the consumer, with the consumer paying for only those movies that are viewed. Preferably, the movies are encoded to prevent conversion and duplication for play on existing DVD, CD or other systems. The encoding technology also prevents playback on user stations of the video distribution system in homes that are not current on payments for previous purchases. In certain embodiments, the encoding system includes a novel time-based encoding technology, and movies may be watermarked so that copies are traceable to the customer site.

The video distribution system of the present invention offers numerous advantages to consumers. For example, consumers have access to new movie releases at those times dictated by market conditions to be most favorable by the content providers and the distributors, often before the movies would be available at video rental stores. Consumers will pay for a movie only after it has been viewed, not when recorded. Thus, consumers are free to record categories or classes of movies (e.g., new releases) and later make a decision as to which movies to actually view—paying only for those that are viewed. In certain embodiments, consumers have access to movies that are automatically recorded, such as popular new release movies and movies that are being promoted by the content provider and/or system operator. Consumers may view the videos at any time without restraints related to broadcasting schedules and with no need to visit a video rental store for selection of the movie or returning the movie. There are no late fees. New movie releases will never be "sold out" as they frequently are in existing video rental stores. Another advantage to consumers is the ultimate lower cost occasioned by the system's elimination of the real estate and labor costs associated with existing video rental stores. Because literally thousands of movies are available on a daily/weekly/monthly basis, the video distribution system of the invention provides a much greater selection than any existing video rental store. The invention also provides full access to content for those who live in geographically remote and/or sparsely populated areas that may presently have little or no access to video rental stores. The invention also allows access to videos for families with young children, elderly persons and handicapped persons where theater viewing and round trips to video rental stores are inconvenient, prohibitive or expensive.

Each user station utilizes high capacity storage such as DVD platters or hard drives for its read/write functions in addition to an operating system that provides greatly simplified on-screen programming. The present invention also provides the ability to update movie pricing at any time, for example on a daily, weekly or monthly basis, so that consumers can choose to view movies at times when content providers offer pricing specials or incentives. When a movie is recorded on a disc, it can be labeled and stored for future play or, depending upon the storage medium, recorded over (similar to a blank VCR tape). As new movies are recorded and shelved, new or previously used videos can be inserted into the platter for future recording. Video quality is improved over existing video rentals where, in most cases, available tapes have been degraded by previous play.

Content providers (e.g., major studio producers) recognize a very significant benefit in that they receive income every time a movie is played, thereby creating significant residual value for their investments. Importantly, new release movies are always available (i.e., not "sold out") during initial peak demand when pricing power is the highest. The mentioned residual value translates into increased income for the content providers because a significant portion of existing content is available for sale every day—since thousands of movies are transmitted on a daily/weekly/monthly basis. The invention also allows content providers to change pricing at any time, e.g., daily/weekly/monthly, to optimize price vs. consumer demand. In this regard, content providers are allowed to meet consumer demand for a significant portion of the existing content inventory value every day. This provides an extremely high benefit by effectively allowing the market to clear (i.e., real demand matches supply), something that the current video distribution model (TV, movie channels, pay-per-view and video rental) do not provide. Additionally, content providers may download preview material that is specific to user profiles.

According to the invention, content providers are confident that they can distribute their movies with extremely high security through the use of appropriate encoding technology. Preferably, the encoding includes time-based encoding technology, with new code keys for every distributed movie transmitted via phone/modem with billing queries every month. Time-based coding, in combination with a single standard proprietary operating system, allows the video distribution system operator to achieve the level of security demanded by content providers. Watermarks coded to each site may be placed in any playback signal to assure that movie copies, even those made by recording at the input to the TV or monitor can be traced to a specific site or purchase.

Transmission providers (DBS satellite system providers, in preferred embodiments) realize the advantage of a significantly increased income base for supporting their services and the utilization of lower cost, off-peak time for transmission of a significant portion of the movies, as well as opportunities to market other products and services to specific customer profiles.

In one aspect, the video distribution system of the present invention includes a data transmission system blanket transmitting a plurality of encoded movies to customer households. A user station is provided at each customer household, the user station including means permitting the customer household to preselect desired transmitted movies for recording. A receiver and associated recording device at each customer household is provided for recording movies. The recorder may be an internal or external hard drive, DVD or CD recording device or other appropriate device. A playback device permits each customer to play back those recorded movies that the customer desires to view. The video distribution system also includes a central controller system having a database for storing therein an address corresponding to each customer household, a communications link between each customer household and the central controller system to verify to the controller unit that a recorded movie has been played back for viewing and a billing system linked to the central controller system to bill customer households for only those recorded movies that are played back for viewing.

In another aspect, the invention may be defined as a method of distributing movies to customer households comprising the steps of blanket transmitting a plurality of movies to customer households, permitting each customer household to preselect and record desired movies, permitting each customer household to playback for viewing any recorded movie, communicating movie playback information from each customer household to a central controller, and billing customer households for only those recorded movies that are played back for viewing.

Other embodiments allow downloading and storage of marketing material, information, transmission schedules, or even several movies that are currently in high demand.

BRIEF DESCRIPTION OF THE DRAWINGS

Some of the features of the invention having been stated, other features will appear as the description proceeds, when taken in connection with the accompanying drawings, in which

FIG. 8 illustrates a Level I time-based coding format that provides enhanced security for the transmitted programming.

FIG. 12 shows the operational sequence for use of the video distribution system of FIG. 11.

FIG. 13 shows a screen containing one example of a simple graphical user interface used by a customer to enter customer movie preference information by movie type.

FIG. 14 shows a screen containing another example of a graphical user interface for entering more complex, multi-level customer preference information.

FIG. 21 is a representation of how neural patterns can be grouped in the library by frame type.

FIG. 22 is a representation showing how, as a video file is being scanned, the specific frame types of FIG. 21 are noted and stored in the pattern library.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

The Overall Video Distribution System, Generally

Figure 1:
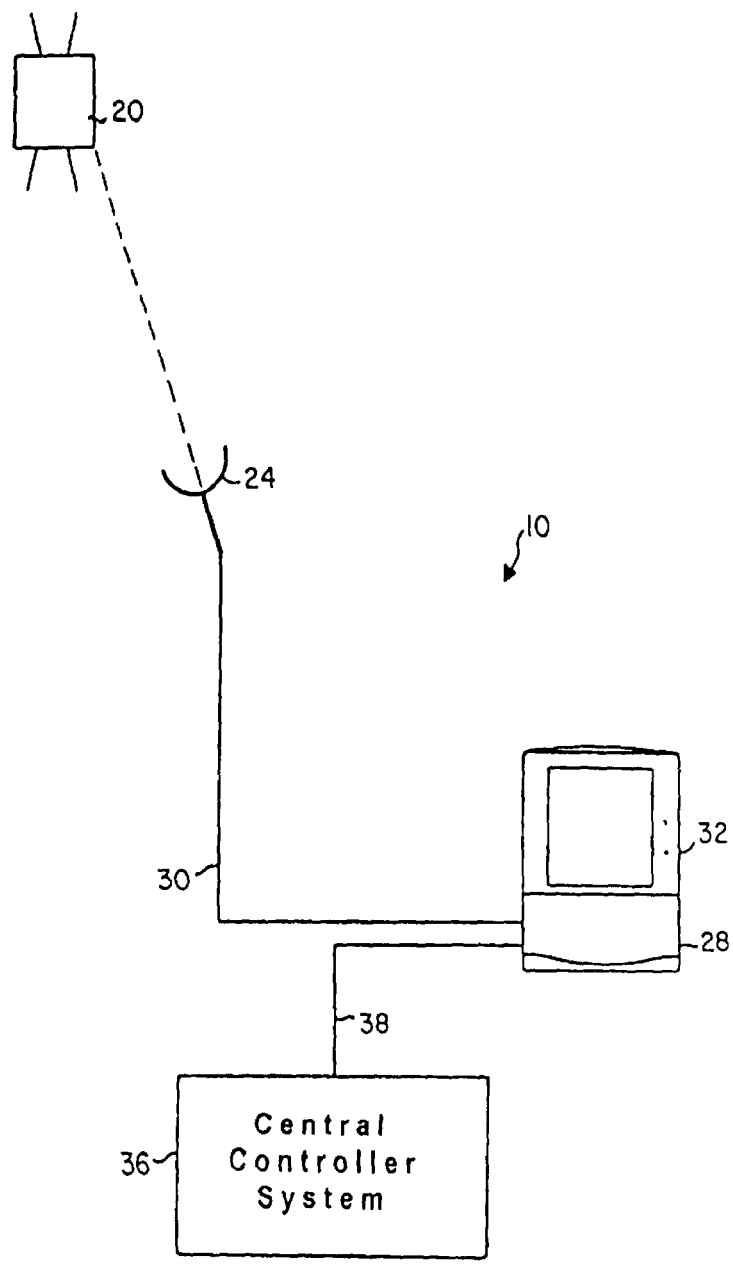
FIG. 1 is a schematic representation of a video distribution system of the present invention utilizing satellite downlink data transmission.

Referring to FIG. 1, there is shown a simple schematic of one embodiment of a video distribution system 10 of the invention. System 10 utilizes direct broadcast satellite (DBS) transmission via satellite 20 as the means for blanket transmitting encoded programming data, either in real time or in time compressed format (discussed below). The program data is received at each customer household by a receiving antenna or dish 24. Dish 24 is linked to a dedicated user station 28 by a satellite receiver link 30. User station 28 is an interactive device permitting customers to preselect desired transmitted movies, record the preselected movies and play back the recorded movies on a video display device (e.g., television 32) anytime the customer wishes to view them. Station 28 communicates at appropriate times with a central controller system 36 via a phone/modem connection 38 (land, Internet or cellular). Central controller system 36 stores a discrete address (e.g., telephone number, credit card number or billing address) for each customer household and receives information via connection 38 to verify that a preselected, recorded movie has been played back for viewing. Central controller system 36 utilizes the movie playback information to bill customer households and also to credit the accounts of content providers. The satellite link (or alternatively the central controller system 36) periodically communicates with each customer household to provide information on available movies and when they will be transmitted, along with pricing information for the playback of specific movies or categories of movies. In preferred embodiments, the satellite link and phone/modem connection 38 transmit time-based code keys for the transmitted movies that form part of the security system for the video distribution system.

Figure 2:
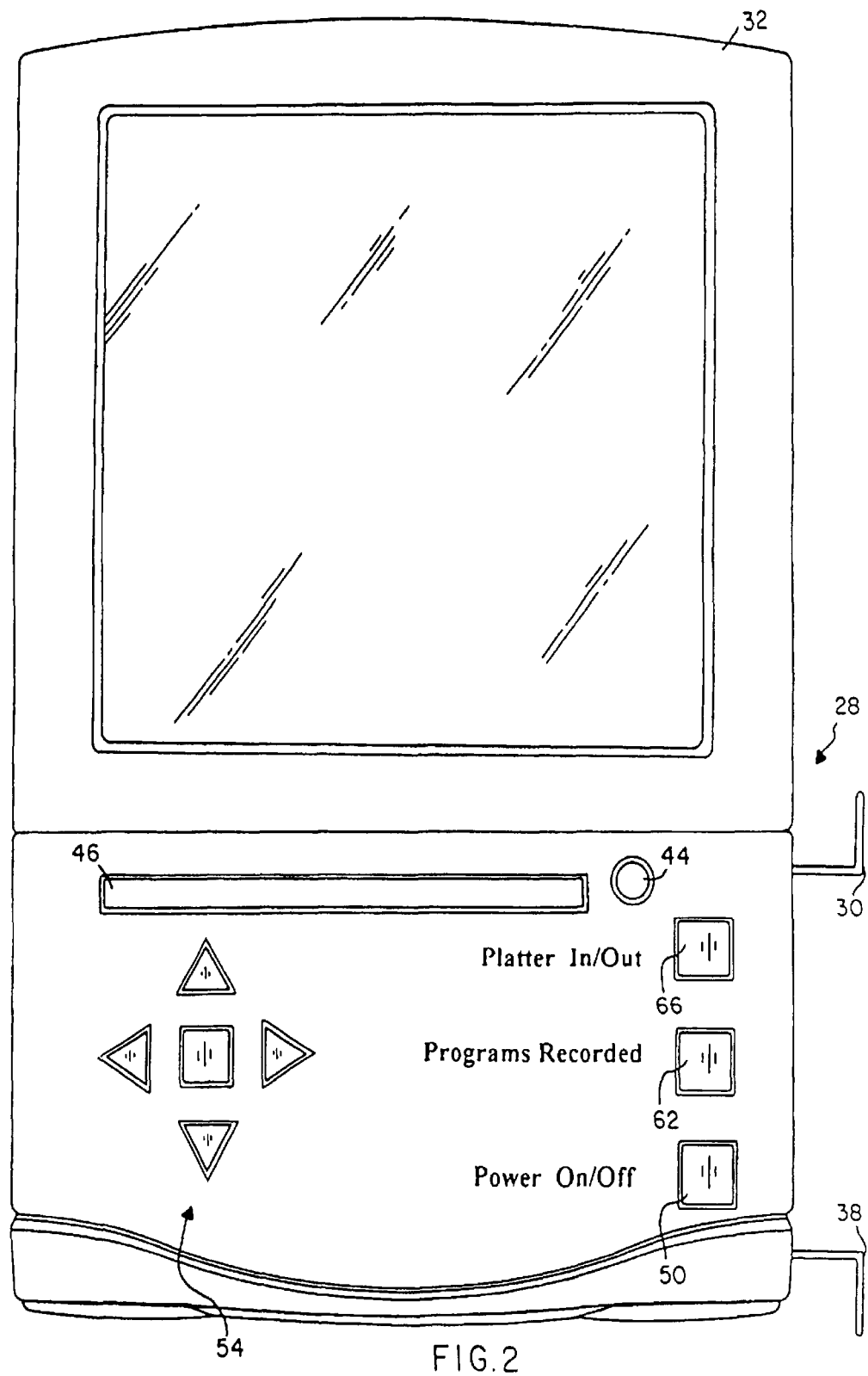
FIG. 2 illustrates further details of a user station shown in FIG. 1.
Figure 3:
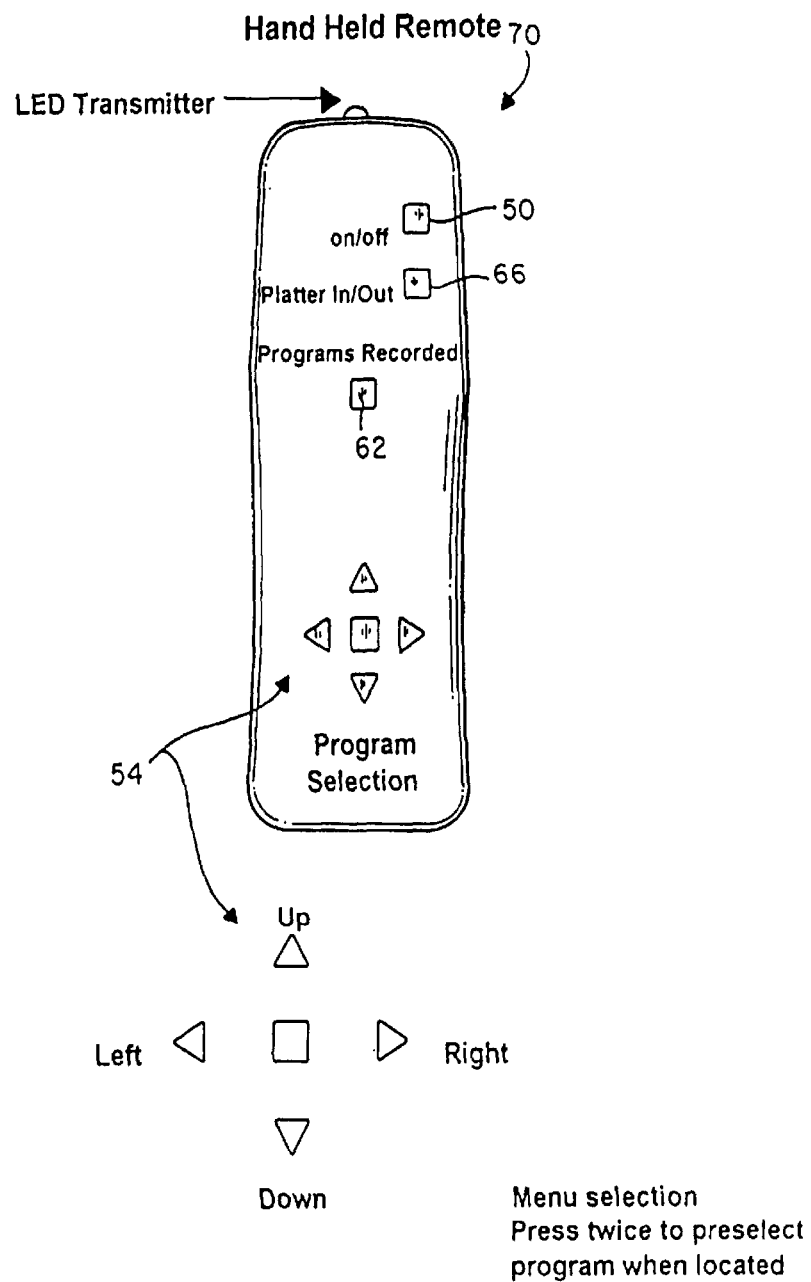
FIG. 3 shows a hand held infrared remote control for use in association with the user station.

FIG. 2 illustrates the front panel of one embodiment of user station 28. Station 28 includes a port for the satellite receiver link 30, a phone/modem connection 38, a remote infrared sensor 44 and a DVD RAM platter 46 (e.g., a 10-disc platter) which is utilized as the write/read mechanism for recording and playback of movies or other content. User station 28 also includes a user interface comprising a power on/off switch 50, a five key program selector 54, a "Programs Recorded" key 62 and a platter out/in key 66, all of which preferably are duplicated on an infrared handheld remote 70 (FIG. 3). A more detailed discussion of the use of user station 28 to review movie availability, to preselect, record and playback movies will be set forth below in the description of the viewer interface and interactive program guide.

The Satellite(s)

According to preferred embodiments of the present invention, data transmission is achieved utilizing geostationary satellites operating in the KU band that are downlinked to conventional receiving antennae or dishes located at the customer households, which are in turn linked to TV Receive Only (TVRO) units connected the customer user stations.

Following the recent acquisition of PrimeStar's assets by Hughes, there are now two digital broadcast satellite providers in the United States, Hughes (DSS) and EchoStar (DISH Network). EchoStar's DISH network launched an additional satellite in September 1999 (its fifth satellite) that, in combination with its previous satellites, provides continuous transmission of greater than five hundred channels to substantially the entire continental United States. EchoStar now has satellites located in the 119, 110, 61.5 and 148 positions within the Clark Belt.

With the above satellite orientations, EchoStar's new "DISH 500" system utilizes an elliptical twenty inch antenna or dish containing two LMBS heads that can receive information from two different satellites simultaneously. As mentioned above, this system permits greater than five hundred channels to be directly broadcast to each customer household.

Currently preferred embodiments of the present invention utilize the EchoStar system, most preferably the DISH 500 system, for programming data transmission at either real time or time-compressed transmission rates, discussed below. In alternative embodiments, the invention may be implemented utilizing the Hughes (DSS) system, or a combination of both the Hughes and EchoStar systems (resulting in a relatively smaller portion of each system's total capacity being devoted to the invention's video distribution).

Data Transmission Parameters

EchoStar's DISH 500 system has 480×704 resolution, providing a very high band width of approximately 4 megabits/sec for each channel, for a total transmission capacity of approximately 2000 megabits/sec for five hundred channels.

As mentioned above, in accordance with certain preferred embodiments of the invention the video content (e.g., movies) may be broadcast at standard VHS resolution (240×352) which translates into a requirement of approximately 1.3 megabits/sec per channel with MPEG II compression. Thus, the full (greater than 2000 megabits/sec) capability of the DISH 500 system translates into the capability to broadcast approximately 1,530 movies simultaneously in real time (i.e., not time compressed). At 110 minutes per movie, the full twenty-four hour capacity is approximately 20,000 movies per day, far greater than total requirements for the video distribution system of the invention.

Thus, according to this aspect of the invention, a portion of the total transmission capability of the DISH 500 system may be utilized to blanket transmit thousands of movies for preselection and recording by customers. In this regard, and as discussed in more detail in the Examples below, new release movies (e.g., the 100 most popular new release movies from major studios) may be transmitted several times per day with concentration before and during prime evening viewing periods, with a second tier of popular movies transmitted less often, but still at least daily, and third and fourth tiers of movies transmitted weekly/monthly—all in accordance with content listings and transmission schedules available to customers through their periodically updated electronic program guide.

It will be appreciated that instead of using more typical 120 watt DBS transponders, implementation of the present invention may be carried out with higher power transponders (e.g., 240 watt transponders) to increase the effective transponder capacity (e.g., from 23 megabits/sec to 30 megabits/sec) by reducing much of the capacity allotted for forward error correction and system management inherent in lower power transponders. Also, along with the use of higher power transponders, the invention may be carried out with quanternary (QPSK) polarization to double the effective bit transfer rate for each transponder over that which may be obtained by using current orthogonal polarization—with a sacrifice in bit error rate that is acceptable for those applications of the invention where lower video and audio resolution is not an important consideration to the customer. Thus, the use of high power transponders (e.g., 240 watts or higher) in conjunction with higher level polarization (e.g., quanternary) permits video distribution systems of the invention to be implemented utilizing less of the DBS system's total transmission capacity, permits the transmission of a greater number of movies or other content, permits more frequent transmission of high demand (e.g., Tier 1) movies and permits greater time compression of movies, or a combination of the above, all to the benefit of consumers.

User Station Details

Figure 4:
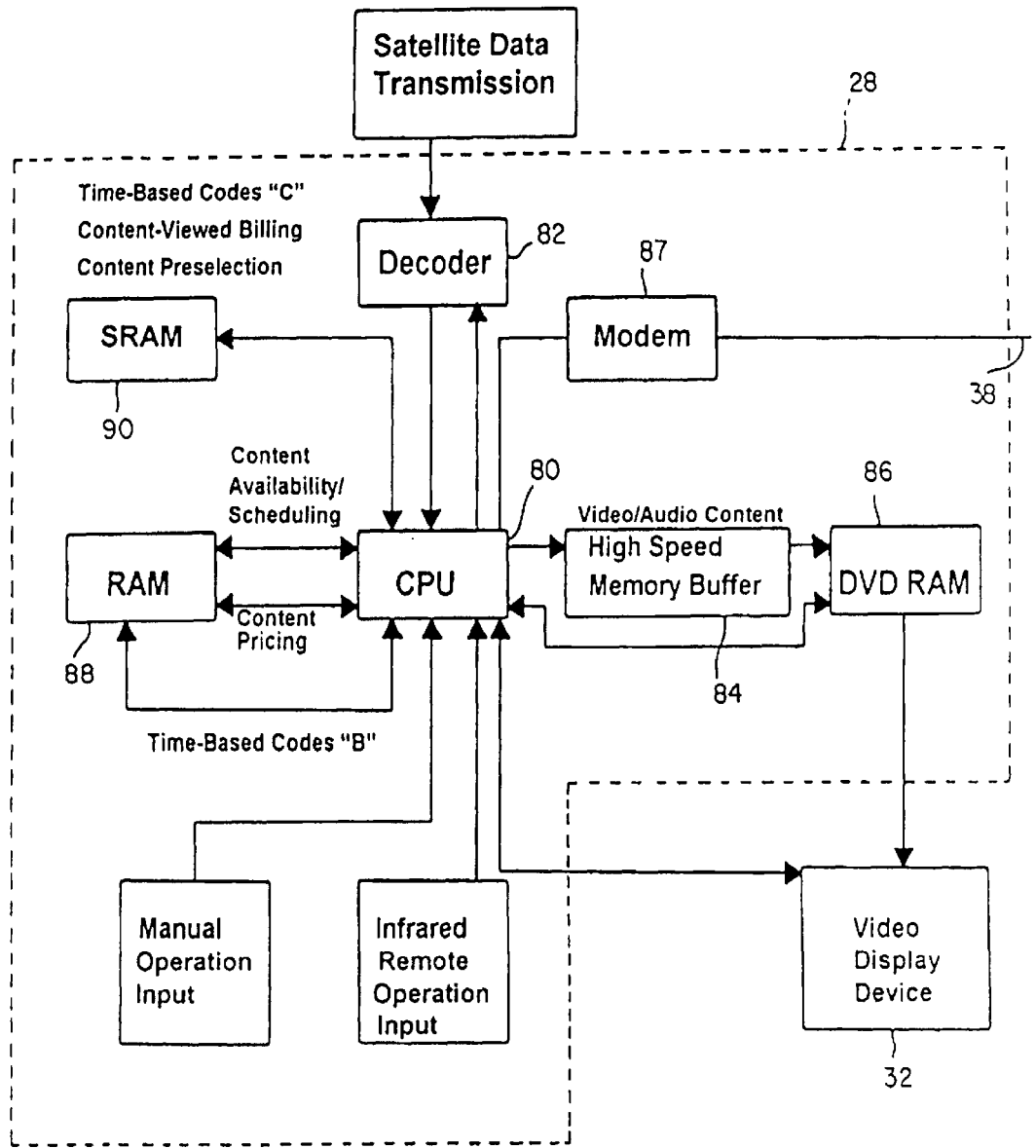
FIG. 4 is a block diagram showing components of a representative user station of the invention.

FIG. 4 is a block diagram showing components of a representative user station 28 of the invention. The primary controller for station 28 is a central processing unit (CPU) 80 that includes a microprocessor, a non-volatile high speed memory device containing the unit's proprietary operating system, a graphics generator, and additional peripheral devices such as a clock that are common in CPU devices.

Encoded programming data via satellite downlink through antenna 24 is transmitted to a decoder 82. Decoder 82 looks for headers indicating movies or other content that have been preselected for recording. The programming data includes video/audio content data, content availability/scheduling data and content pricing data. Decoded preselected movie data is transmitted via CPU 80 to a high speed memory buffer 84 (with or without high capacity storage capability) and then written to a DVD RAM disc 86 that is associated with the DVD RAM platter 46. In certain embodiments, the high speed memory buffer 84 may utilize a magnetic drive, a magneto-optical drive, an optical drive, or other suitable drive. Buffer 84 may utilize DRAM, flash memory, SRAM or other suitable memory such as digital tape.

As will be appreciated by those skilled in the art, in alternative embodiments the transmitted data may bypass CPU 80.

An internal or external modem 87 connects to a phone line that provides communication to the central controller system 36.

The content availability/scheduling data, content pricing data and time-based security codes B (discussed below) are transmitted at periodic intervals (e.g., every ten minutes, every hour or every day, as deemed most desirable by the video distribution system operator) and are routed from CPU 82 to RAM 88 where the information is stored and available.

Viewed-content information used for billing purposes, content preselection information entered by the user and time-based security key codes C (discussed below) are stored and available in SRAM 90.

CPU 80 directly receives manual and infrared remote operation input data. The video display device 32 receives input from the DVD RAM platter for playback of movies and receives graphics data from CPU 80 for display of the interactive program guide.

It is understood that important aspects of this invention may be provided by different electronics configurations such as a central server to support, and in certain cases to replace, functions carried out by the RAM, SRAM and DVD RAM shown in FIG. 4. In addition, SRAM or a suitable high speed memory drive could be used to fulfill the function provided by the RAM (shown in FIG. 4). Other embodiments may include an additional disc drive in support of the system data storage and retrieval functions.

Viewer Interface/Interactive Program Guide

The viewer interface and interactive program guide will now be described in connection with how they permit a customer to review available movies, preselect movies for recording, playback movies for viewing and perform other associated functions.

Figures 5, 6, 7:
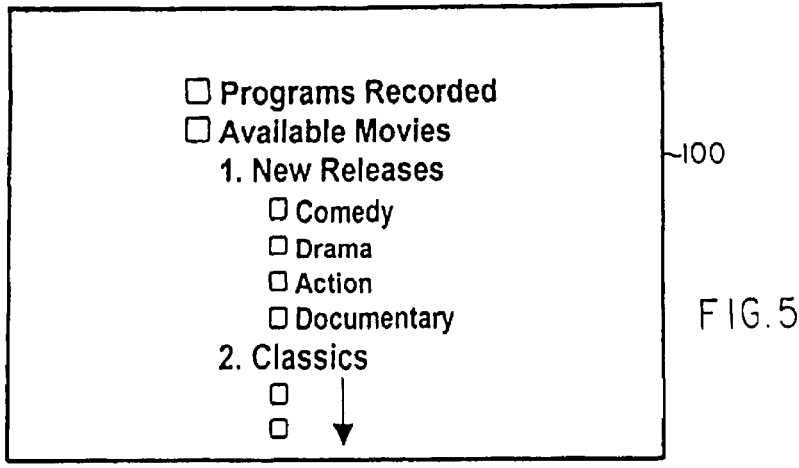
FIGS. 5-7 show several screens that appear on the display when a customer reviews available movies, preselects movies for viewing and performs other associated functions using the interactive program guide.

Referring to FIG. 5, there is shown a representative screen 100 that is displayed on the video display device 32 when a user initiates use of the system via on/off key 50. By utilizing the four (up/down, left/right) keys of the program selector 54 and by clicking on "Programs Recorded", the user may choose to first determine the status of the multiple (e.g., ten) disc positions in the DVD RAM platter, i.e., what movies are currently recorded and stored in the DVD RAM platter at which disc positions, which disc positions contain blank discs and which disc positions have no discs. FIG. 6 shows a representative screen 110 indicating the status of each disc position. Once this information is displayed, the user may elect to playback a movie that is already on the platter, remove disc(s) for storage, etc.

After, or instead of, using the "Programs Recorded" function, the user may use the "Available Movies" function to scroll down through a listing of movies in the interactive program guide that, as shown, may be based on various categories of available movies. For example, the first category of movies is new releases, which may be subdivided into, for example, comedy, action, drama, documentary, etc. After a particular category of movies is chosen (e.g., new releases/comedy) another screen 110 (FIG. 7) is displayed showing the titles (in this case twenty titles) in this category. In order to preselect a title for recording, the cursor is moved to the chosen title and the middle key of program selector 54 is pressed twice, the first press showing the current playback price and changing the background color of the display (indicating "selection mode") and the second press completing the selection.

It will be appreciated that the interactive program guide may include links to a short summary of a movie being considered, critical review(s) of the movie or a brief "clip" or preview of the movie. This information may be stored in internal memory, obtained through a link to the website of the video distribution system operator or obtained by direct Internet access to the websites of film producers, movie rating services, etc. (See FIG. 2A.) Other suitable means for providing movie information may also be employed.

Program Security Utilizing Encoding Technology

As mentioned above, in certain embodiments of the invention programming security is best achieved by time-based coding, in combination with the utilization of security codes that are interlaced into the video frames.

The proprietary operating system utilizes standard interlaced encoding data that, as known in the art, prevents movies recorded by a customer at a user station from being played on other nonconforming playback devices (for example, standard DVD playback devices). In addition, recognizing the possibility of pirates utilizing data conversion technology to defeat this security technique so that bootleg copies could be run on other systems, and recognizing the prospect of recorded movies being played on user stations that are not current on payment or are otherwise unauthorized, the invention incorporates a time-based code key to assure that playback of recorded content can only occur on currently authorized user stations.

FIG. 8 describes one preferred Level I time-based coding format wherein a first code key A comprises a 32-bit monthly code at the beginning of each transmitted movie. With one such code key provided for each month over an extended period of time, say 100 years, there is a total of 12×100=1200 32-bit code keys A per movie.

A second code key B comprises a 32-bit code for each month chosen by the video distribution system operator at the beginning of each month. Code keys B for all available movies are blanket transmitted to customer households each month by the data transmission means, preferably, satellite.

A third code key C comprises another 32-bit code for each available movie. Code keys C are delivered to each customer household by phone/modem on a monthly basis, preferably at the time of monthly billing queries from the central controller system 36 to the household. The third code keys C are provided only when the customer household is current in payments and otherwise is in good standing.

The time-based coding of FIG. 8 assures that a movie will playback at a specific user station only when all three code keys A (transmitted with the movie), B (chosen and blanket transmitted monthly) and C (delivered monthly by phone modem) are present, with the user station software simply verifying that C is the correct value when a predetermined mathematical function is applied to A and B.

Level II security coding comprises a 128-bit code interlaced through every third frame of the movie. This code, in conjunction with the decoding software of the unit's proprietary operating system, is used to assure that recorded movies can be played only on stations provided to consumers by the video distribution system operator. (The players incorporated into the proprietary user stations of the video distribution system simply read and ignore Level II code.)

Thus, recorded movies may not be played back on standard DVD players. However, even if a determined pirate were to defeat the Level II code to produce a disc playable on a standard DVD player, a pirated copy would be useful only until the end of the month, due to Level I time-based coding protection, discussed above.

Optional Level III coding may be utilized to relate Level I and Level II coding in a specific location in each movie over multiple frames where the Level II code is a more complex (e.g., 1024K) program requiring completion from the time-based coding of Level I.

In addition to the security means discussed above, preferably each user station 28 must be in an enabled state. In this regard, an enabling command from central controller system 36 (via phone/modem) may be sent monthly to each customer household that is in good standing.

To deter production of copies of movies recorded at the box connections to the TV, a digital watermark identifying the purchasing customer may be placed in the movie signal. The watermark would be unnoticable to a viewer but would allow copies of the movie to be traced to the original purchase site.

As an alternative to monthly billing queries by the central controller system 36 to each customer household, monthly provision of code keys C and monthly provision of an enabling command to customer households in good standing, as described above, these functions may be carried out each time a movie is played back for viewing via a two-way communication between central controller system 36 and the customer household. To this end, when a customer initiates playback of a movie through the interactive controls, the playback information (the identity of the movie and the identity of the customer household) is communicated to central controller system 36 by phone/modem, at which time central controller system 36 verifies good standing status for the customer household and sends back a single code key C for the specific movie and an enabling code for the user station. Utilization of this form of communication between a user station and central controller system 36 at the time of every playback offers the advantage of the video distribution system operator not having to send thousands of key codes C (for all available movies) on a monthly basis to each customer household (where the key codes C must be stored in memory) and the further advantage of assuring good standing of the customer household's account prior to each movie playback. A further advantage is that customers' accounts may be billed more currently, at the time of each playback instead of monthly.

Central Controller System

Figure 9:
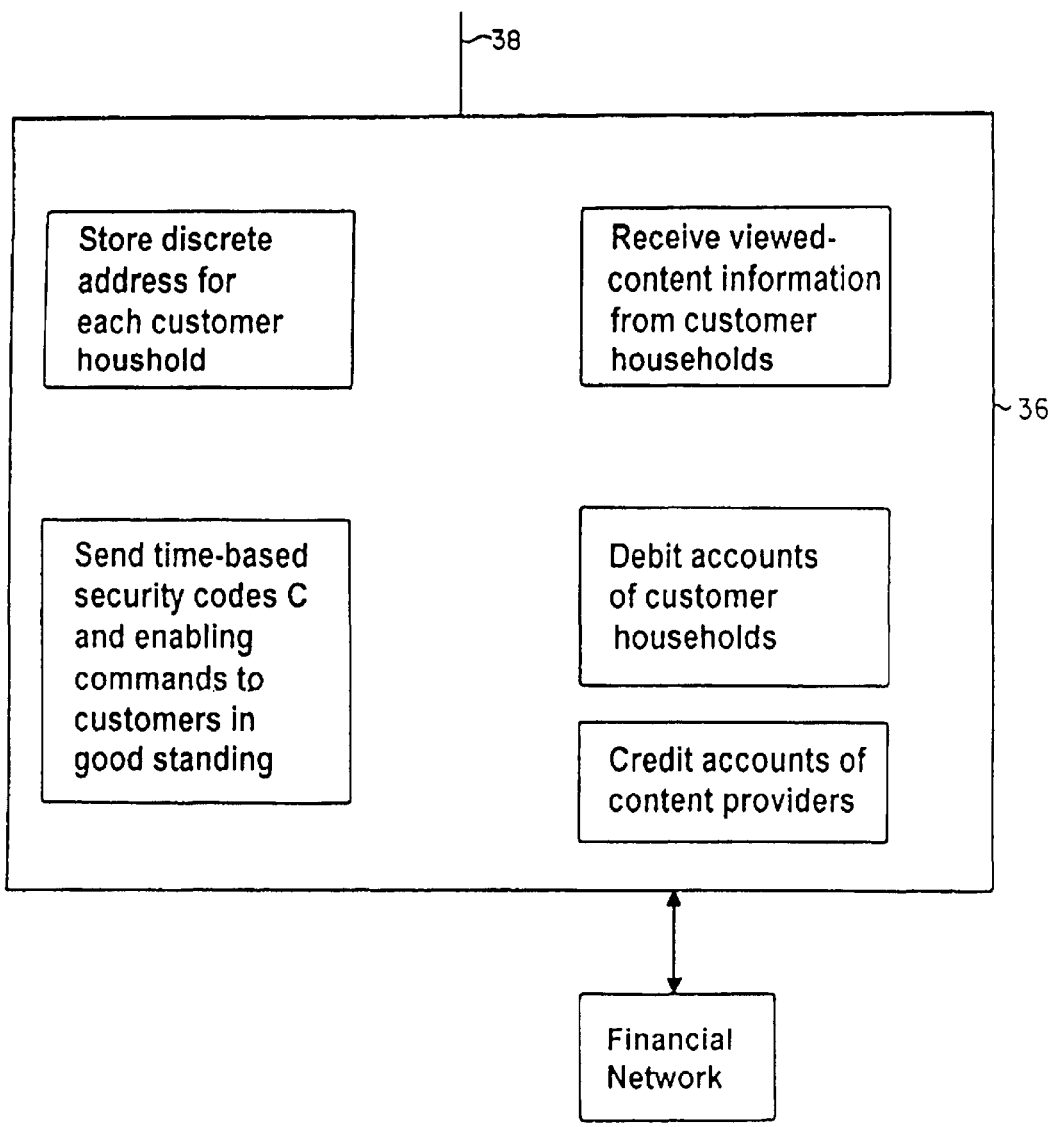
FIG. 9 is a block diagram showing functions of the central controller system.

Referring to FIG. 9, the central controller system 36 will now be discussed in more detail. As discussed above, in one preferred embodiment central controller system 36 provides the following functions:

1. Stores a discrete address for each customer household.
2. Transmits monthly billing query to each customer household to determine which preselected, recorded movies were viewed.
3. Sends monthly transmission of time-based security codes "C" and an enabling command to each customer household that is current in its payments and otherwise is in good standing.
4. Credits accounts of content providers for the use of their content through linkage to a financial network.
5. Debits accounts of customers for movies viewed.

Alternative Data Transmission Technologies

Figure 2A:
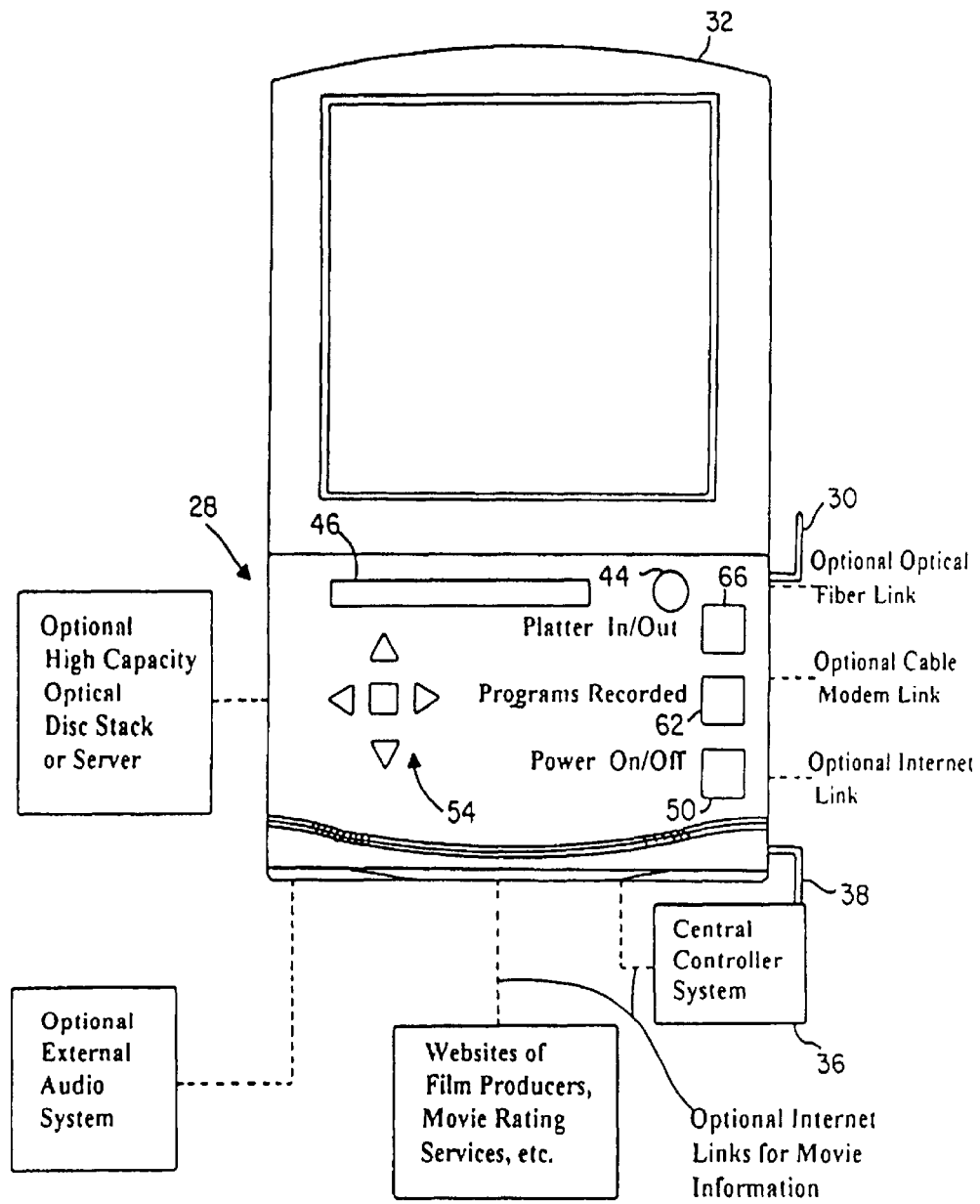
FIG. 2A is a view of the user station of FIG. 2 showing several optional features.

Referring to FIG. 2A, several alternative data transmission technologies may be utilized in place of or in addition to direct broadcast satellite (DBS) which is discussed above.

A first option is data transmission by optical fiber employing suitable technology, preferably an optical fiber technology providing high transmission rates, for example OC3. A single OC3 optical cable transmits data at approximately 128 megabits/sec so that, at VHS resolution, it can transmit approximately sixty movies simultaneously at real speed, or transmit one movie every two minutes at a time-compressed speed.

Other options include cable/modem transmission, Internet connection, other suitable phone connections, or the use of higher or lower frequencies than KU if licensed for satellite-based content transmission, or a combination of any of the transmission means discussed herein.

It will be appreciated that video/audio content transmitted by any of the above means, whether transmitted at real time or at a time-compressed speed, may run in series for simultaneous recording on multiple stations at a consumer household.

Business Models

The present invention provides significant flexibility with respect to the business model to be used to commercialize the invention. In one simplified embodiment, shown in block diagram form in FIG. 10, the video distribution system operator interfaces with three parties, the data transmission provider, the content providers, and consumers. The content providers provide content to the data transmission provider which, in turn, blanket transmits the content to the consumers, preferably by direct broadcast satellite. The satellite transmission also includes content availability/scheduling data and content pricing data, updated periodically. The content providers also provide copyright license and pricing requirements to the video distribution system operator. Both the data transmission provider and the content providers receive payments directly from the video distribution system operator. Lastly, the video distribution system operator periodically receives viewed-content information for billing, while also sending enabling commands to the consumers.

Other business models may utilize time-based security coding as discussed above. Also, the Internet may be used to provide centrally posted content availability information and permit preselection of movies for recording at the customer's household.

EXAMPLE I

Figure 10:
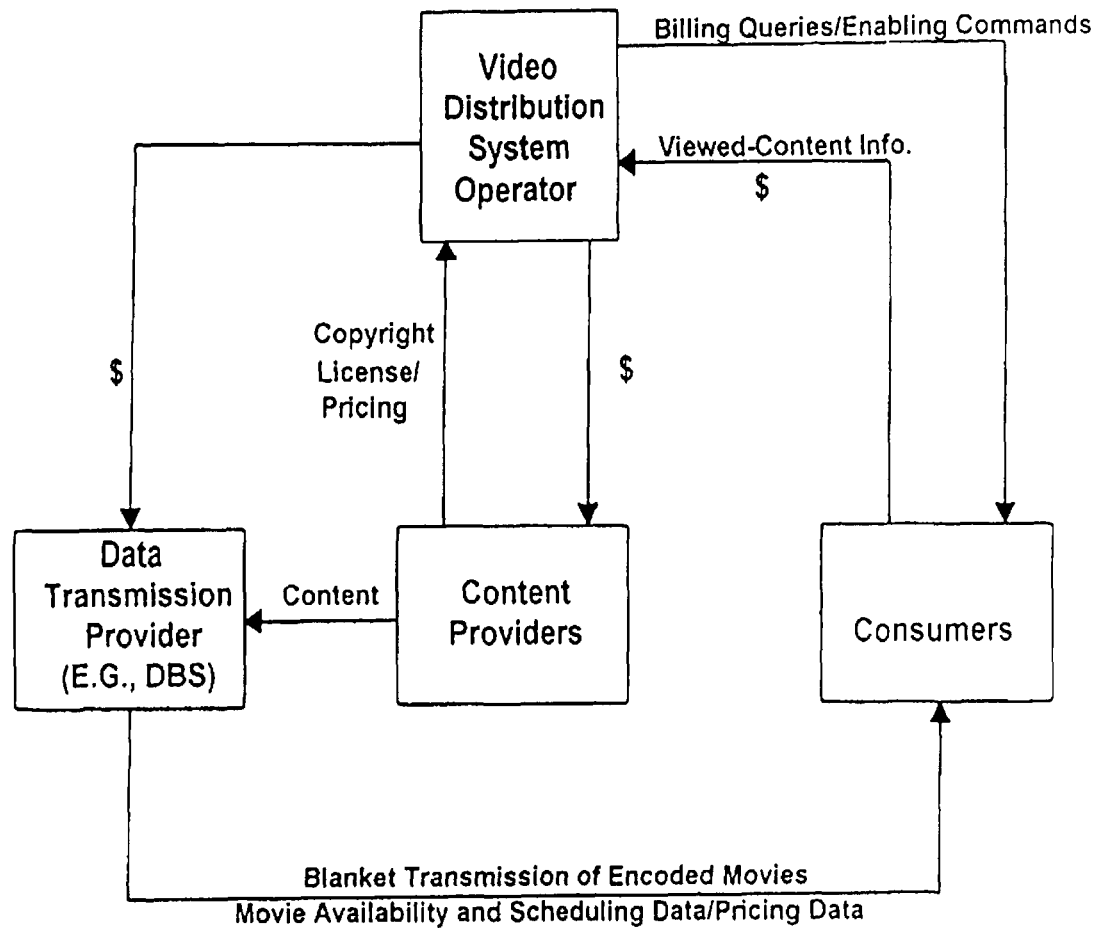
FIG. 10 is a block diagram of one simplified embodiment of a business model for commercializing the video distribution system of the invention.

The video distribution system of the present invention is implemented using the business model of FIG. 10, the DISH 500 DBS system, and the other hardware and software systems described above and illustrated in the drawing figures.

The video/audio content provided by the video distribution system is transmitted in real time (i.e., not time-compressed—average movie 110 minutes). The movies are blanket broadcast utilizing approximately 49% of the total capacity of the DISH 500 system, with transmission times heavily weighted for Tier 2, 3 and 4 movies to off-peak broadcast hours (e.g., 1:00 am -8:00 am).

Movie "Hierarchy"

Tier 1: The current 100 new release movies from major studios.

Tier 2: The 6000 movies that are at the second level of consumer demand after the Tier 1 new release movies.

Tier 3: The 8000 movies at the third level of consumer demand.

Tier 4: 60,000 additional movies.

Transmission Schedule

Tier 1: Each new release movie is transmitted every day on the hour from 4:30 pm to 8:30 pm, and at several other times daily.

Tier 2: Each Tier 2 movie is transmitted once per day.

Tier 3: Each Tier 3 movie is transmitted once per week.

Tier 4: Each Tier 4 movie is transmitted once per month.

A consumer who wishes to plan ahead can easily record all new releases in the "comedy" category, for example, and have them available for viewing at his pleasure, with payment obligations arising only for those movies he actually views, when he views them. The same consumer or another consumer wishing to view a new release on the evening at which the viewing decision is made, simply preselects the movie for recording any time during the day so that it will be available during the evening viewing hours. An Internet phone/modem connection (not shown) may be provided so that consumers may access their user stations from remote locations (e.g., from their business offices) to preselect movies for viewing that evening.

The term "movies" as used in connection with the Examples, and as used at other times herein, encompasses more than the term traditionally implies. The term "movies" may encompass not only motion pictures and similar content, but also certain content that appears in the lower tiers, especially Tier 4, such as classic sporting events (e.g., all Super Bowls) and popular TV series (e.g., all episodes of Star Trek or Sienfeld or I Love Lucy). In this regard, a customer who wishes to do so may record all episodes of I Love Lucy (transmitted monthly in Tier 4) on a multiple disc platter, store the discs and playback selected episodes any time he desires, paying only when he views an episode or episodes.

EXAMPLE II

The video distribution system of Example II is implemented with the same tiers of movies as Example I with the difference being that the Tier 1 movies are transmitted in compressed time format to a high speed memory buffer contained in the user station which, in turn, writes to the DVD RAM disc at its maximum write speed. This compressed time transmission (e.g., 8 to 10 minutes per movie) permits consumers to have movies, particularly Tier 1 movies, available on short notice, often in a time less than or on the order of that time required for a round trip to a video rental store. To further facilitate this enhanced availability of movies on short notice, according to Example II Tier 1 new release movies are transmitted every 30 minutes from 5:30 pm to 8:30 pm, and at several other times daily.

EXAMPLE III

Same as Example II except that all movies are transmitted in compressed time format.

EXAMPLE IV

The video distribution system of this Example IV is implemented with the same tiers of movies as Examples I-III. According to Example IV, the recording and playback device of user station 28 comprises a magneto-optical disc recording and playback device that has the capacity to write to a magneto-optical disc at write speeds on the order of 12 megabits/sec or greater, a write speed that is approximately 8 to 10 times the data stream speed for conventional VHS resolution video/audio transmission and playback (with conventional MPEG II compression). Utilizing an approximately 12 megabit/sec write speed, and a corresponding data transmission speed via DBS or other suitable transmission means, a movie may be transmitted in time-compressed format and recorded at 8 to 10 times real time, so that a 110 minute movie may be transmitted and recorded in approximately 11 to 14 minutes or less.

In order to provide ready consumer access to new-release movies, each of the 100 Tier 1 movies is broadcast from 6:00 p.m. to 9:00 p.m., at 15 minute intervals. Thus, during these prime time hours, a consumer may select any Tier 1 movie and have it available for viewing within 15 to 30 minutes. (With faster transmission and write speeds the Tier 1 movie availability time period may be reduced accordingly.) As with Example II, the Tier 1 movies are also transmitted at several other times daily, for example, hourly.

According to Example IV, Tier 2, 3 and 4 movies are also transmitted and written to discs in compressed time, for example, at approximately 12 megabits/sec or greater.

EXAMPLE V

The distribution systems described in Examples I-IV have the capability to transmit audio in compact disc (CD) quality or another form to a suitable storage medium such as read/write CD's, write only CD's, DVD RAM, magneto-optical disc, digital tape or a central server. In this Example V, the consumer may choose any music selection from up to as many as 80,000 or more titles in a tiered transmission structure similar to Examples I-IV and use less than 10% of the existing DBS transmission capacity.

With music distribution under this Example V, the system allows the user to listen to the recording (e.g., CD) several times for free before the consumer is required to permanently select the CD. Once permanently selected, the CD receives a permanent enabling code and the consumer pays a one time fee—similar to the current one-time fee structure which is standard in the existing music distribution business model. The player then plays the CD through TV speakers or provides an audio output to an optional external audio system (FIG. 2A). This music distribution model eliminates a significant portion of the labor, real estate and transportation costs inherent in the current distribution models for music, much as the novel movie distribution model described herein eliminates costs in the distribution of movies as compared to current models. The music distribution model of this Example V may utilize DBS or the alternative data transmission means described above, either alone or in combination.

EXAMPLE VI

The distribution system of Example IV is augmented with CD quality music transmission capability where 10,000 titles per day are transmitted at a time-compressed speed of, for example, 12 megabits/sec or greater. The music transmission of this Example VI may be carried out by utilizing additional DBS capacity, by reducing the number of Tier 2 movies transmitted daily, by reducing movie transmission in other tiers, or by a combination of the above. As described above in connection with Example V, the customer may listen to the recording several times for free after the encoded transmission is stored (with or without the use of memory buffer 84), before the purchase selection. Once the purchase selection is made, the recording preferably is written to a conventional CD so that it may be played back on conventional home or auto playback devices. To this end, the user station 28 may include positions for holding and writing to conventional CD's—in addition to the ability to write to another medium such as DVD RAM or magneto-optical discs used for storage of movies. In the alternative, once the recording is selected, it may be routed to the external audio system (FIG. 2A) which has its own CD read/write or write only device that will permanently write the selected recording to a CD that can be held in a single, stack or platter system.

One Alternative User Station Configuration

Figure 11:
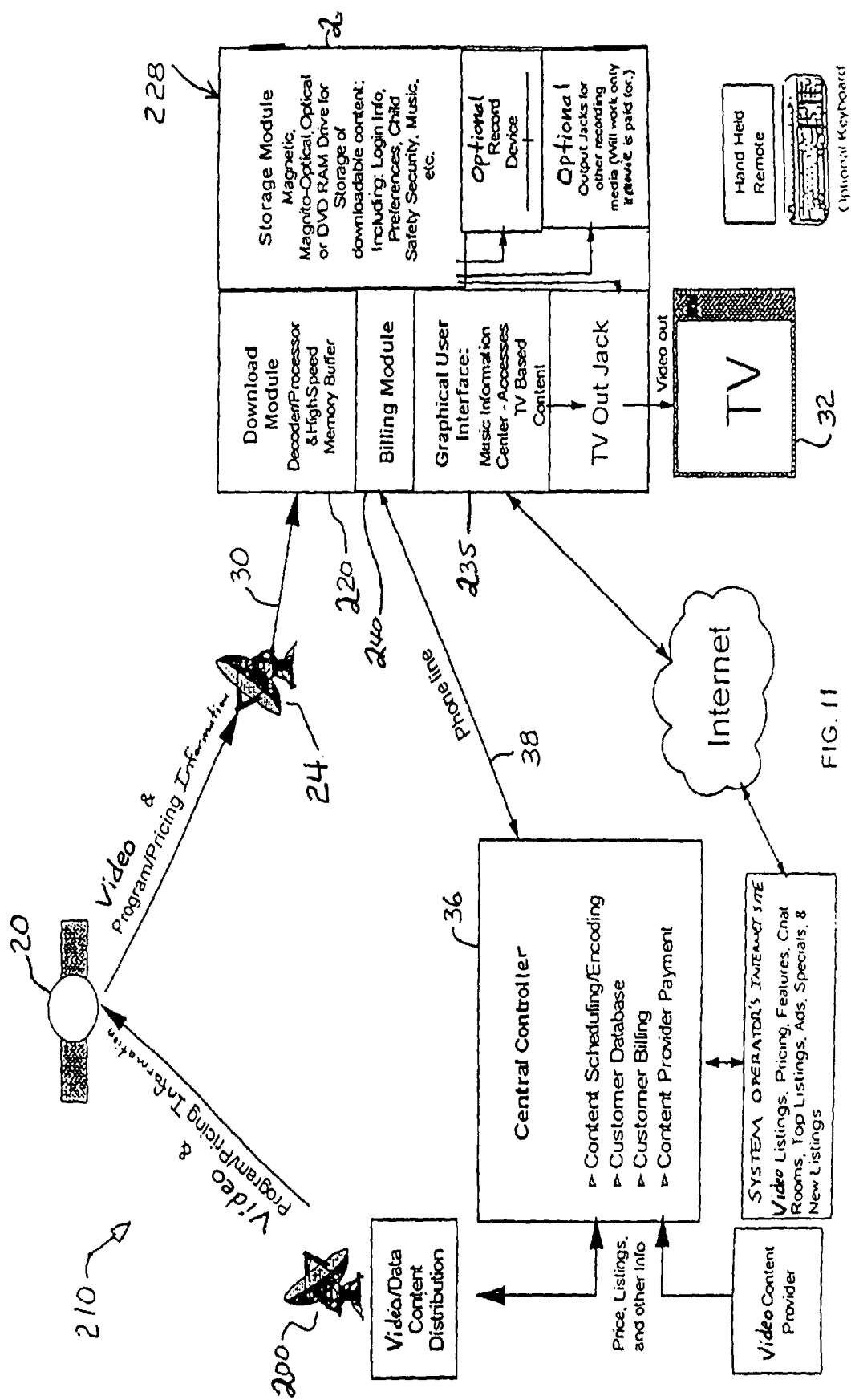
FIG. 11 is schematic representation of another satellite-based video distribution system that utilizes a relatively large hard drive as the primary data storage medium.

FIG. 11 illustrates an alternative user station configuration that is substantially similar to user station 28 of FIGS. 1, 2, 2A and 4, with a primary difference being the use of a large disk drive as the primary memory component. The encoded video content is scheduled and transmitted to the direct broadcast satellite up-link facility 200 by the system operator through system controller 36. In addition, periodic digital program/pricing information is transmitted to the up-link facility, for example, every ten minutes. The digital video content and program/pricing information, once received by the appropriate satellite, are then transmitted down broadly (i.e. "blanket transmitted") to geographic coverage areas where the user stations can receive the downlink transmissions via the home user's satellite dish 24. Data is then transmitted to download module 220 contained in user station 228 where it is stored digitally in storage module 230, preferably in a large disk drive having a storage capacity of 20 gigabytes, or more. The use of a disk drive of suitable size permits the storage of up to six to twenty or more movies at one time in storage module 230. Thus, a video distribution system may be operated with customers storing and playing back movies solely by using the hard drive of storage module 230. Additionally, for those customers desiring to build a library of movies, user station 228 may include an optional recording/playback device that records movies onto, for example, a DVD RAM, and plays back these movies through the user station at any desired time, with customers paying only when they view the movies. While it is preferred that the movies in such a library remain fully encoded and encrypted for playback only on a user station in the system operator's network, user station 228 may include a CPU or CODEC capable of real-time decryption and decompression as the movie is recorded to a storage medium such as a DVD, so that such movies may be played on a standard DVD player. The decryption/decompression process preferably processes digital watermarks in these recorded movies so that a unique customer or transaction number is hidden in the movie, thereby allowing a copy of the movie to be traced to its source. Suitable watermarking technologies are available to those skilled in the art.

The transmission of movies in compressed time format has been discussed above. This mode is particularly appropriate when larger hard drives are installed in the customer's user station. A typical VHS movie requires about 10 gigabits of storage (about 1.3 gigabytes), and an HD movie requires about 12 gigabytes of storage. Thus a 20 gigabyte hard drive could hold a dozen VHS movies or one HD movie. Typical receivers can receive a maximum of 27 megabits per second per transponder and current units can only receive one transponder at a time allowing downloading a typical 110 minute VHS movie in about eight minutes or an HD movie in about 55 minutes. Other receivers may contain multiple tuners allowing simultaneous downloading of several movies, or a movie and a CD, or several CD's while watching a live baseball game.

The sequence of operation for a customer of the system using user station 228 is summarized in FIG. 12, which is large self-explanatory. The illustrated modes of operation, following account set up, are identified as:

1. Selection
2. Ordering
3. Downloading
4. Viewing
5. Billing
6. Optional "Library" Copy Delivery.

"On-Demand" Movies

As discussed above, storage module 230 of user station 228 includes a storage medium (e.g., a hard drive) that stores each movie that the customer selects until such time as the customer either deletes the recording from memory, or the recording is written over when the storage medium's capacity is reached (e.g., on a "first in, first out" basis). When the user station is provided with a storage module 230 having a substantial data storage capacity, it is possible for many movies to be immediately available to the customer for viewing. For example, a user station 28 in the form of a DBS (or cable) system "set top box" may have a disk drive with a storage capacity on the order of 20 Gigabytes or more, with most of the storage devoted to the movie storage function of storage module 230. This storage medium permits the storage of approximately six to twenty, or more, compressed movies at all times in each customer's user station. The customer, therefore, at all times has immediate on-demand access to the movies in his storage module for viewing or permanent recording on his recorder (e.g., DVD writer). Movies on the hard drive preferably are stored in encrypted format to prevent loss.

Thus, one advantage of a large storage capacity at storage module 230 is that a customer may maintain a significant number of movies in storage for a considerable period of time before having to make a decision on whether to view (and pay for) a particular movie. However, this large storage capacity opens up other possibilities, as well. For example, according to one manner of carrying out the invention, the system operator may automatically (i.e., without requiring customer preselection) download certain very popular movies (usually very popular new releases) to every customer storage module on a periodic basis, such as one featured movie every day. At one automatically downloaded movie per day to each customer, a fifteen storage capacity and a "first in, first out" write-over protocol would permit each automatically downloaded movie to remain in storage module 230 and available for on-demand viewing for approximately two weeks, with the exact time depending upon how many customer-selected movies are downloaded during that period. Thus, over any two week period, the system operator may automatically make available (at one automatic download per day) 14 popular movies for all customers, without the customers having to preselect anything. Of course, the preselection option for all catalog movies remains available at all times. It will be appreciated that the automatic downloading of movies to all customer user stations can be readily achieved by the system operator simply communicating (e.g., daily) to all user stations the ID header information for that day's automatically downloaded movie or movies. The user station downloads movies to the intermediate storage in storage module 230 just as if the recording had been preselected by the customer. The graphical user interface alerts the customer that the recordings are available by a cue such as "YOU'VE GOT FLICKS".

Using Customer Preference Information

In a more customer-specific manner of carrying out the invention, different sets of movies are automatically downloaded at customer user stations according to the movie preferences of the customer. For example, each customer may use the graphical user interface (see FIG. 13) to select those movie types (e.g., romantic comedy, documentary, action) they most prefer. The system operator uses this information to tailor the automatic downloads to that customer's user station accordingly. In a simple application, the system operator may create, for example, five to ten standard customer profiles so that each customer receives automatic downloads for the one of those profiles which he most closely matches. The objective is for the storage module 230 to have available for on-demand viewing a large percentage of the movies that any particular customer may be interested in at any given time—or at least have those movies available to the customer over a period of time as new entries into storage overwrite older entries, recognizing that at all times the customer is free to order any movie from the catalog.

As described above, the system operator may create, for example, five to ten customer profiles and assign each customer to one of these profiles according to movie preference information entered by the customer. Thereafter, the customer receives (e.g., daily) the automatically downloaded movies for his particular profile category. However, in other embodiments of the invention, customer preference information may also be used in a more sophisticated fashion to tailor the profiles to the individual tastes of a customer or the tastes of the customer household family members. To this end, the customer may use the graphical user interface (FIG. 14) to enter movie preferences at a desired level of detail. As shown in FIG. 14, a first level of detail is the selection of one or several types of movies (similar to the selection made in connection with FIG. 13). In addition, the customer may go to a second step where each selected type of movie may be further subdivided by, for example, favorite movie star(s), top ten movies this month, etc. Other means for subdividing interest areas under a particular type of movie may be used (e.g., World War II,). However the expression of movie preferences is made, this information may be used alone, or in conjunction with other information, to permit the customer's user station to download to memory (e.g., fifteen movie capacity) an ongoing, rolling selection of movies that will most likely match the preferences of the customer.

Figure 15:
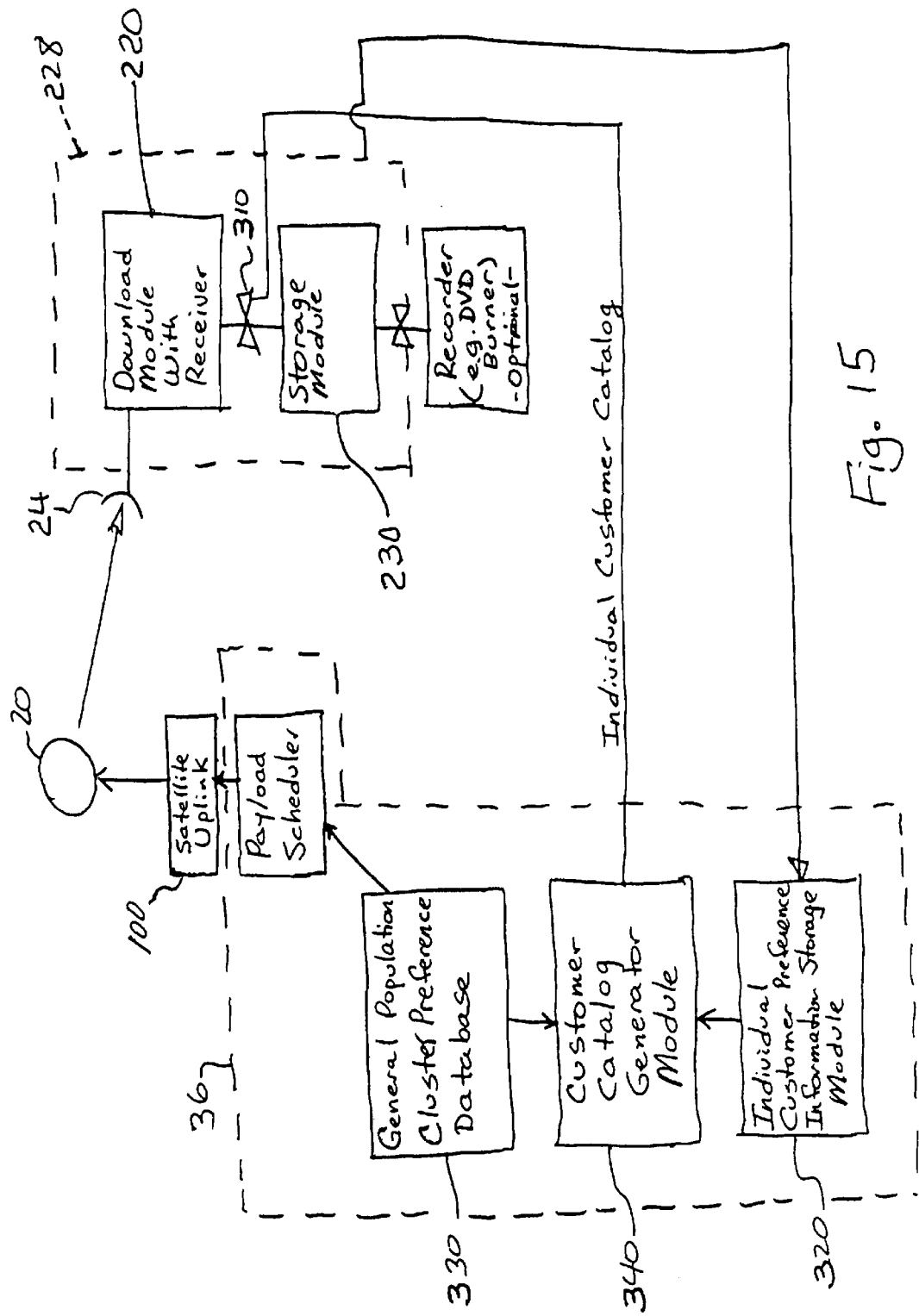
FIG. 15 is a block diagram showing how customer preference information entered by customers and general population clustered preference data compiled and analyzed by the system operator are used to create customized preference-based downloading choices at the customer user stations.

Referring to FIG. 15, there is shown a block diagram that illustrates in schematic form the generation and use of customer preference information. FIG. 11 shows portions of user station 228, namely, the download module 220 with receiver and the storage module 230 for movie storage. The optional recorder for permanently recording "library" movies (e.g., DVD burner) is also shown. As schematically shown between user station 228 and storage module 230, apparatus 310 serves to read the ID headers on all of the broadcast movies and select for downloading to module 230 only those that are indicated as being desirable to the customer by the processed movie preference information.

FIG. 15 also shows portions of central controller 36 that store and analyze customer preference information and customer order information, and generate from that information the individualized "customer catalog" that determines which movies will be automatically downloaded at that customer's user station. To this end, controller 36 includes an individual customer preference information storage module 320, a general population cluster preference database 330 and a customer catalog generator module 340. Each customer's preference information is entered in the manner described above via the graphical user interface and is communicated to module 220 by phone/modem. In addition, the preference information of the entire customer population (or some subset thereof), as well as order data, is stored in module 330. Information from modules 320 and 330 is analyzed to create an individual "customer catalog" for each customer via module 340. The individual customer catalog data is communicated to the user station in each customer household and serves to assure that those movies that best fit the preference customer profile are the ones that are downloaded to storage module 230. While a first-in, first-out protocol may be used for overwriting onto the hard drive of module 230, the customer catalog information may serve to establish a different protocol that will overwrite the less likely to be purchased movies ahead of those recordings which, by analysis at module 340, show more promise of being viewed by the customer. Certain new release movies in high demand within the customer's primary areas of interest may be designated to remain in storage for a minimum period of time, say one week, regardless of the "traffic" through storage module 230.

Along with movies, there is blanket transmission of catalogs and other advertising or customer interest information. The storage and display of this information may be based on customer profiles. For example, an advertisement for a new movie that is expected to appeal to young adults, Julia Robert fans, and customers living in a particular geographic area would have this information contained in its header, and the receiver would recognize if any of its users are in any of these categories and will appropriately store or not store this advertisement on the hard drive, and may determine to display or not display this ad on the user's TV catalog. Similarly, advertisements for other related merchandise, like "Star Wars" paraphernalia, might also be displayed. Text describing individual movie stars or related events might also be stored with the catalog.

Promotion-Based Streaming

Figure 16:
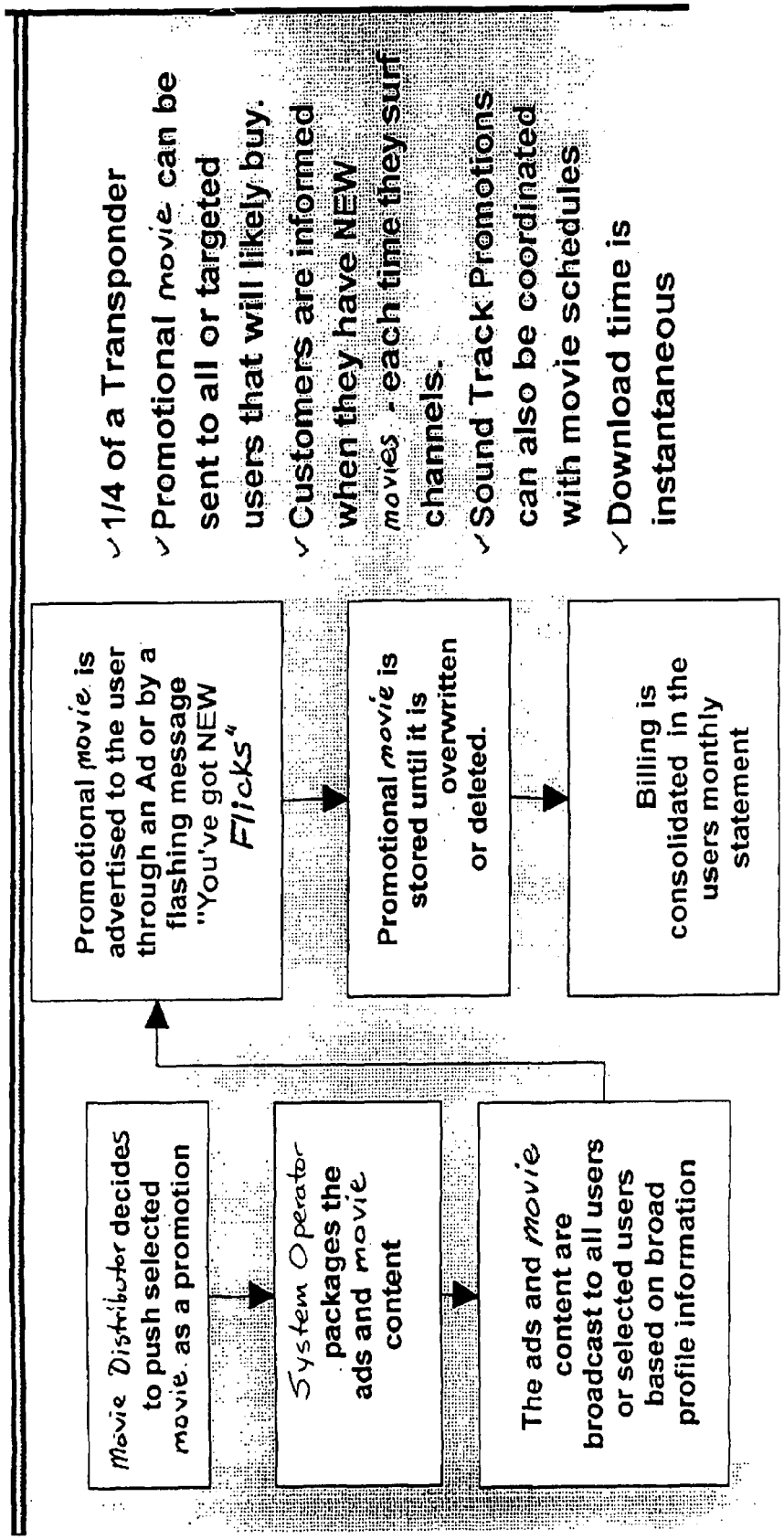
FIG. 16 is a flow sheet showing the procedure for promotion-based streaming of movies, for example where a movie distribution company decides to push a selected movie as a promotion.

FIG. 16 shows the use of promotion-based streaming to download movies at customer user stations. A content provider (e.g., movie distribution company) may decide to push a selected movie as a promotion. The system operator packages the advertisements and movie and then broadcasts them for automatic downloading by all customers or by a selected group of customers based on the broad profile information developed by the operator (FIG. 15). The promotional movie is advertised to the customers through an advertisement that appears at the top of screens generated by the system, or by a flashing message such as, "YOU'VE GOT NEW FLICKS". Promotional movies are stored in storage module 230 until they are overwritten or deleted. As with the other means of providing movies for viewing, once the customer views the movie, the billing is consolidated in the customer's monthly statement. Promotional-based streaming may be accomplished typically in a relatively short period of time using appropriate bandwidth (e.g., one quarter transponder).

In applications of the invention where both movies and music are made available to customers, promotions may include movie soundtracks for movies that are being broadcast by DBS or cable. In this situation, prior to broadcast of the movie, the soundtrack is broadcast and automatically downloaded to all user stations. When the movie is broadcast, viewers of the movie are informed that the soundtrack for the very movie they are viewing is on their hard drive and available for immediate on-demand purchase. Purchases may be made during the movie by appropriate means; for example, a translucent icon may appear on the screen and purchase made by simply clicking on the icon. Or, the purchase can simply be made at the conclusion of the movie where, preferably, viewers are reminded that the soundtrack is available on their hard drive for on-demand purchase.

Alternative Embodiments: Transmission and Storage of Highly Compressed Video Files As mentioned above, utilizing current technology, transmission of the video portion of a movie at standard VHS quality for MPEG 2 compression requires approximately 2.4 megabits/sec of bandwidth. A 100-minute movie stored at this compression requires a file size on the order of 1.3 to 1.8 gigabytes, typically about 1.6 gigabytes, which can be stored on various media discussed above, but which is too large for a one-sided compact disc (approximately 600 megabytes storage capacity) or a two-sided CD (approximately 1200 megabytes storage capacity). Preserving desirable (e.g., VHS quality) video playback for the consumer, while reducing these bandwidth and data storage requirements, is desirable, particularly if the movie file can be stored on a two-sided CD or, even more preferably, on a single-sided CD. (Preferably, current audio encoding/decoding technologies, such as those from MPEG, Microsoft, Liquid Audio or Dolby, can continue to be used for the audio portion of the movie.)

Several embodiments of video encoding, compression and processing that achieve the above goals will now be described with reference to FIGS. 16-22.

Figure 17:
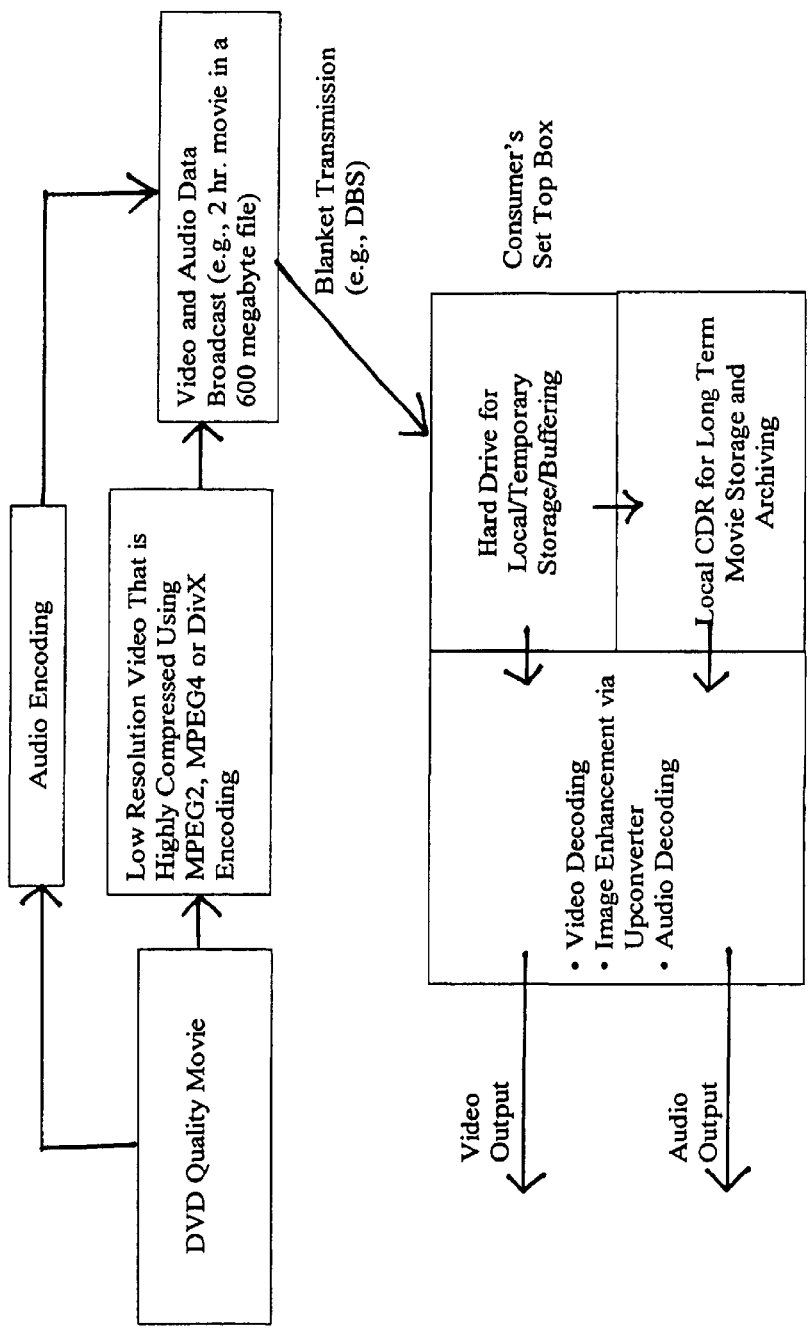
FIG. 17 is a schematic representation of an embodiment of the invention wherein the video portion of a movie is highly compressed prior to being blanket transmitted at low resolution. The video is enhanced by an upconverter at the customer's user station (set top box), thereby permitting transmission and storage of the video as a smaller file while still permitting the customer to enjoy a picture with the desired resolution, for example, VHS resolution.

Video Encoding Utilizing Existing Codecs and an Upconverter (FIG. 17)

IBM Corporation (France) has developed a digital video upconverter IC that performs real time upconversion of an incoming video stream and outputs a video pixel stream at up to 3 times the input rate, for the purpose of providing a high definition (HD) or near HD signal to an HD digital TV from a relatively low resolution input. As its primary advantage, this IBM upconverter permits broadcasters to provide HDTV-like services without using the precious bandwidth that would otherwise be required. The IBM upconverter uses a combination of functions to increase the number of lines, remove interlacing, enhance pixelization through spatial and temporal interpolation and increase the frame rate enabling users with high resolution television sets to view high definition video with low resolution input. The IBM upconverter IC is described at http://www.fr.ibm.com/france/cdlav/video.htm, incorporated herein by reference. Other suitable upconverters may be used.

According to the present invention, upconversion technology is used in a new way for image enhancement of a low resolution, blanket transmitted video input stream (e.g., at 0.8 megabits/sec) so that it can be displayed at an apparently higher resolution (e.g., VHS) at the customer's television. Referring to FIG. 17, the video portion of a movie is highly compressed using, for example, MPEG 2, MPEG 4 or DiVX encoding to the lowest possible resolution that can be upconverted at the set top box to permit VHS quality viewing. In certain embodiments, this might be accomplished by shrinking a normal VHS picture from full-screen to quarter-screen size and then compressing the screen comprising a quarter-screen image with the rest of the screen black. The highly compressed, low resolution video is blanket transmitted to the consumer's set top box where conventional decoding hardware (MPEG 2, MPEG 4, DiVX) decodes the signal and an upconverter, preferably one employing three-dimensional spatial/temporal interpolation such as the IBM upconverter IC referred to above, increases the pixelization rate to a point where the quarter-screen video may be viewed by the consumer as a full-screen image. The compressed movie (video and audio) may be stored via a local hard drive for local temporary storage. It may also be stored via a CDR on a single-sided or double-sided CD prior to decoding and upconversion provided, as is in preferred embodiments, the total broadcast data will fit on a CD.

It will be appreciated that the above described techniques of FIG. 17 not only permit blanket transmission of the movie file using less bandwidth and the ability to store an entire movie on a CD, but also protects the transmitted content by degrading it before transmission and then using specialized processing at the set top box—a type of processing that is poorly handled on a PC and requires a specialized chip.

Figure 18:
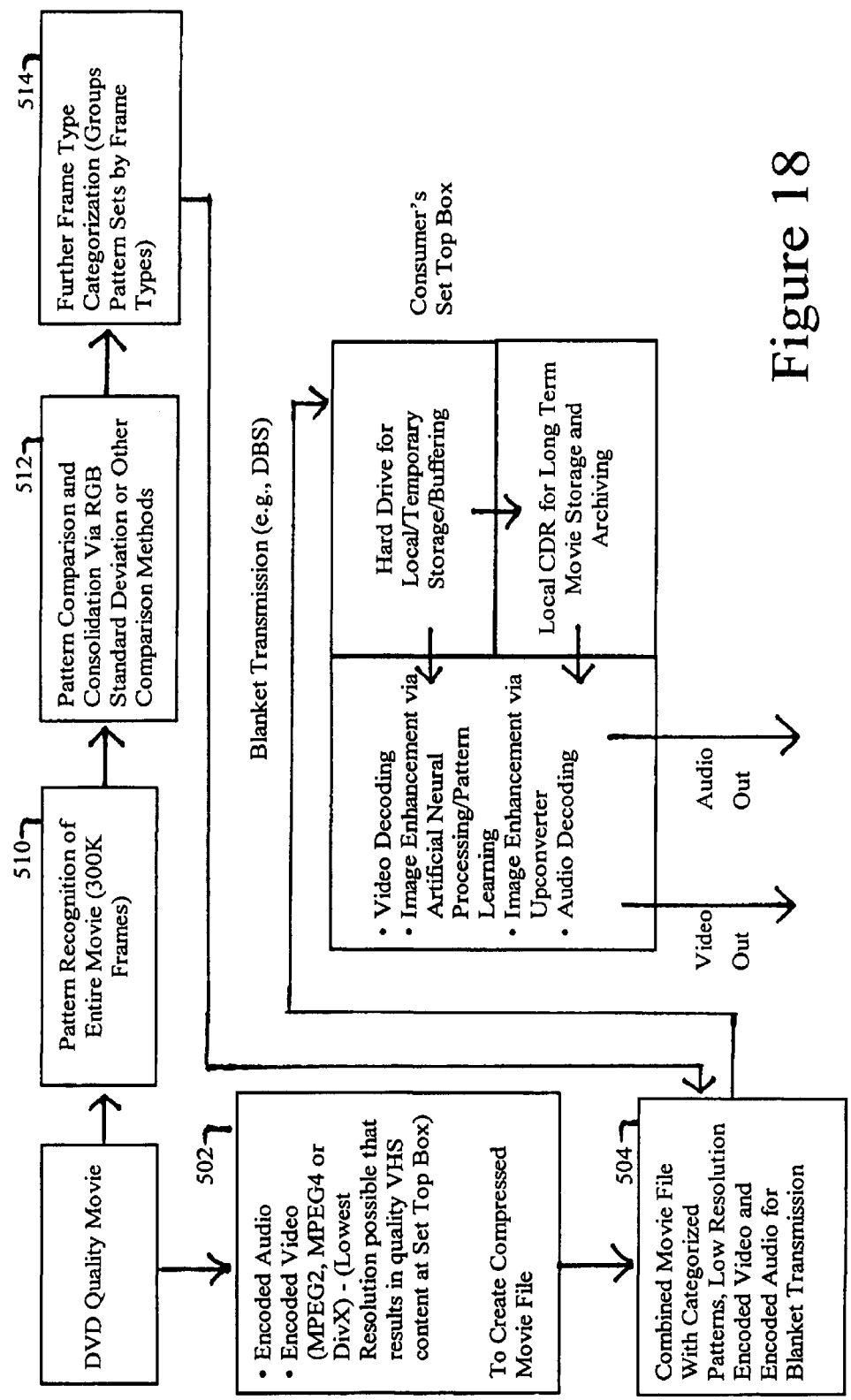
FIG. 18 is a schematic representation of another embodiment of the invention wherein a hardware implementation of artificial neural networks is used to sample the video portion of a movie frame by frame to create a library of neural patterns. The library of patterns for the movie is blanket transmitted along with very low resolution, highly compressed encoded video, with the transmitted video file undergoing pattern recognition image enhancement at the set top box and, optionally, up-conversion as well.

Video Encoding Utilizing Zero Instruction Set Computer (ZISC) Pattern Recognition on a Video-By-Video Basis (FIG. 18)

Another development by IBM Corporation (France) is a zero instruction set computer (ZISC) that utilizes an hardware implementation of artificial neural networks for noise reduction and image enhancement of a gray scale digital still image. By way of summary, the ZISC chip set (e.g., IBM ZISC036) can recreate images from pattern recognition learning. The ZISC chip set can be taught the difference between original and a degraded image (degraded from high compression or additive noise) by processing samples of each (the higher number of samples, the better the processing ability and resulting images) and then recreate the original image from an extremely poor quality or degraded image. A discussion of the ZISC technology can be found in "Noise Reduction and Image Enhancement Using a Hardware Implementation of Artificial Neural Networks", published in VI-DYNN'98-Virtual Intelligence-Dynamic Neural Networks-Stockholm, Sweden, Jun. 22-26, 1998, and in U.S. Pat. Nos. 5,621,863; 5,701,397; 5,710,869; 5,717,832; 5,740,326 and 5,943,670, the contents of which are incorporated herein by reference.

In accordance with the invention, and with reference to FIG. 18, a highly compressed version of the video (e.g., the video portion of a DVD movie) is created at encoder 502 with a compression method such as MPEG 2, MPEG 4 or DivX at the lowest resolution possible that will result in VHS quality output at the consumer's set top box (STB). This highly compressed, low resolution video is stored in database 504, along with audio that is encoded using standard encoding/decoding technology as identified above. In certain embodiments of the invention, a 100 to 120 minute movie may be compressed in this manner to a file on the order of 500 to 600 megabytes or less, a file that can be stored on a single-sided CD, or alternatively, to about 1100 megabytes for storage on a two-sided CD.

In parallel, utilizing the zero instruction set computer's pattern recognition capabilities, the video portion of the DVD movie is sampled frame by frame at 510. Each sample takes the form of a recognizable pattern that may be, for example, an 8 pixel by 8 pixel pattern that can be stored in 64 bytes. The number of samples per frame is at or near the number to effectively recreate the frame at VHS quality, for example, sampling about 1000 to 2000 samples per frame. As each frame is sampled, optimal patterns are stored. Optimal patterns are those permitting maximal enhancement of the video images that will be degraded by resolution reduction or additive noise prior to transmission. A typical movie has less than 300,000 frames to sample. The resulting database will be substantially less than 600,000,000 samples because so many of the samples can be reused. All of the resulting samples are stored as a digital neural archive (DNA) pattern library. Preferably, the patterns undergo comparison and consolidation at 512 and frame type categorization (described below) at 514.

Once the frame patterns have been created and stored in the DNA library, the library of patterns is packaged up at 504 with the highly compressed version of the video, and with the encoded audio. For transmission, the entire contents of database 504 is sent. The DNA library of patterns for the movie can be sent and buffered first, followed by the highly compressed video content. Once the patterns are received at the customer's set top box, they are cached in memory for image enhancement to the video. The video content can be streamed in or stored for later playing. When the video is played, it is first decoded using a standard video decoding method (MPEG 2, MPEG 4, DiVX) and then sent to the ZISC processor for enhancement with the pattern database. Thereafter, optionally, but preferably, the resulting images are sent directly to an upconverter to increase the pixelization rate, as described above in connection with FIG. 17.

It will be appreciated that for archiving and storage, the system only needs to store the patterns, along with the highly compressed video file (and the encoded audio). In certain preferred embodiments of the invention, the entire movie, video and audio, and DNA library can be stored on a single-sided CD. Thus, in accordance with this aspect of the invention, the set top box may include a hard drive or other suitable memory device for local temporary storage, as well as a CD recordable device (CDR) for recording movies onto one-sided (or, less preferably, two-sided) CD's for long-term movie storage and archiving.

Figure 19:
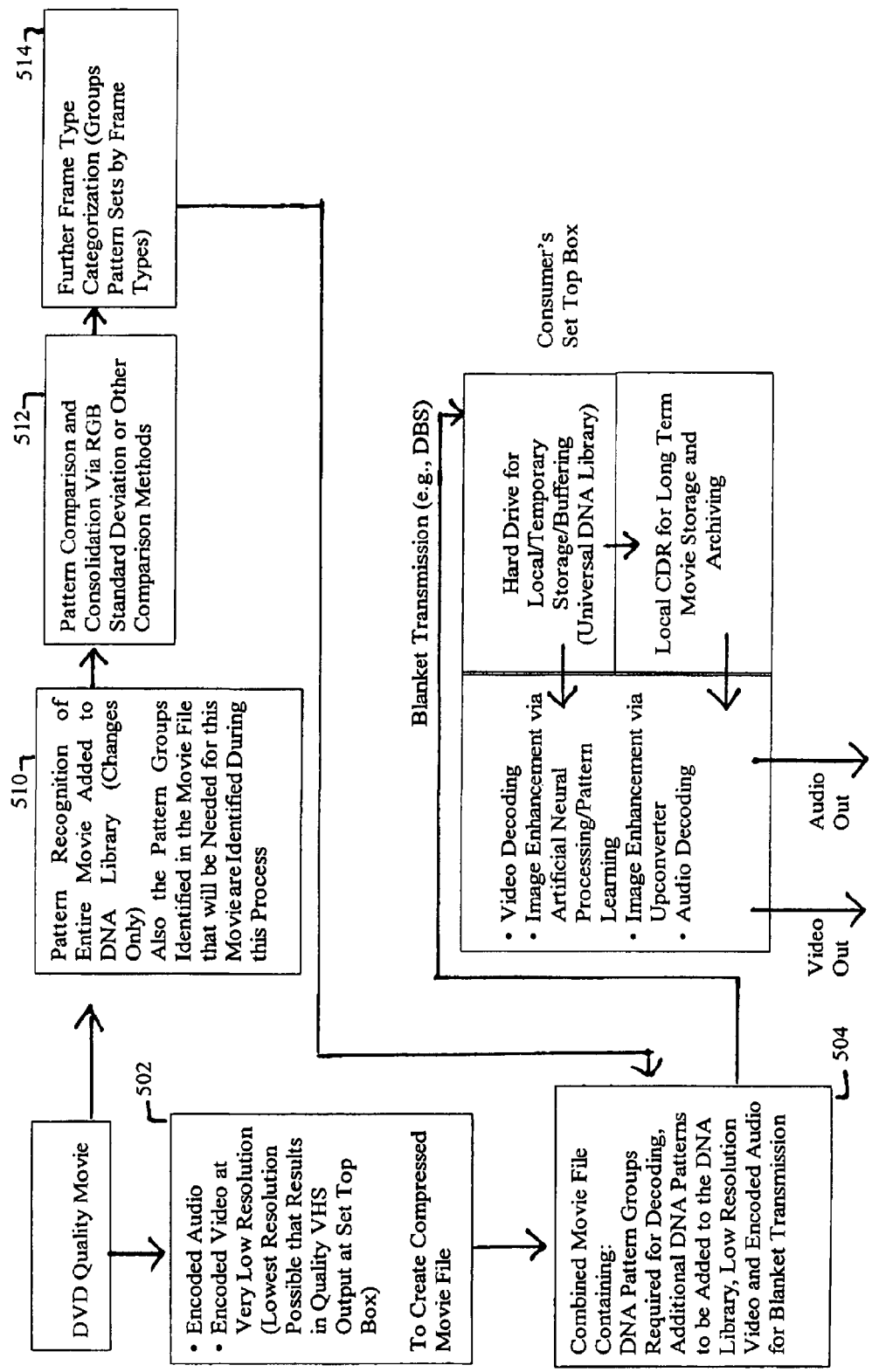
FIG. 19 is a schematic representation of an embodiment that is similar to that of FIG. 18 except that the set top box contains in memory a universal library of neural patterns for image enhancement of the transmitted video so that a complete, unique pattern library for each transmitted movie does not have to be transmitted along with the movie.

Video Encoding Utilizing ZISC Pattern Recognition for Any Video Source (FIG. 19)

Once a substantial number of videos have been successfully learned through pattern recognition methods described above, eventually there will be enough patterns in the DNA library that the library may be used to enhance virtually any type of video. Once this is accomplished, the DNA library becomes a database that no longer needs to be attached to the video file, but can be stored on remote devices (for example, on disc or ROM) for movie enhancement purposes. Thus, as shown in FIG. 19, the customer's set top box can include a stored universal DNA library so that the transmitted movies need not be accompanied by their own pattern library information. In this regard, the universal library may include libraries for various video types, for example, broadcast sports, old black-and-white movies, animation movies, or other broad color palette video types.

Referring to FIG. 21, it will be appreciated that patterns can be grouped in the DNA pattern library by frame type. Grouping in this manner enables the library to be further categorized and to reduced access speed to the library by the ZISC processor.

Referring to FIG. 22, it will also be appreciated that as a video file is being scanned, the specific frame types may be noted and stored in the DNA pattern library. The library pattern groups are grouped by the most likely patterns to be used for a given frame type in the video. The goal is to reduce the number of patterns and to group them to the point that they can be stored and read as needed from the ZISC processor.

Thus, the ZISC-enabled compression technology described above relies on a DNA library of small image types (for example, 8 by 8 pixels) to decode. The library is valuable because:
1. It provides extra security, especially if the library is communicated separate from the media and stored in the set top box.
2. It may allow a higher level of compression of the media so the compressed video with or without its respective library information can be stored on a single CD.
3. It may provide extra security by requiring a hardware chip whose functions cannot be run quickly on a PC type processor.

Figure 20:
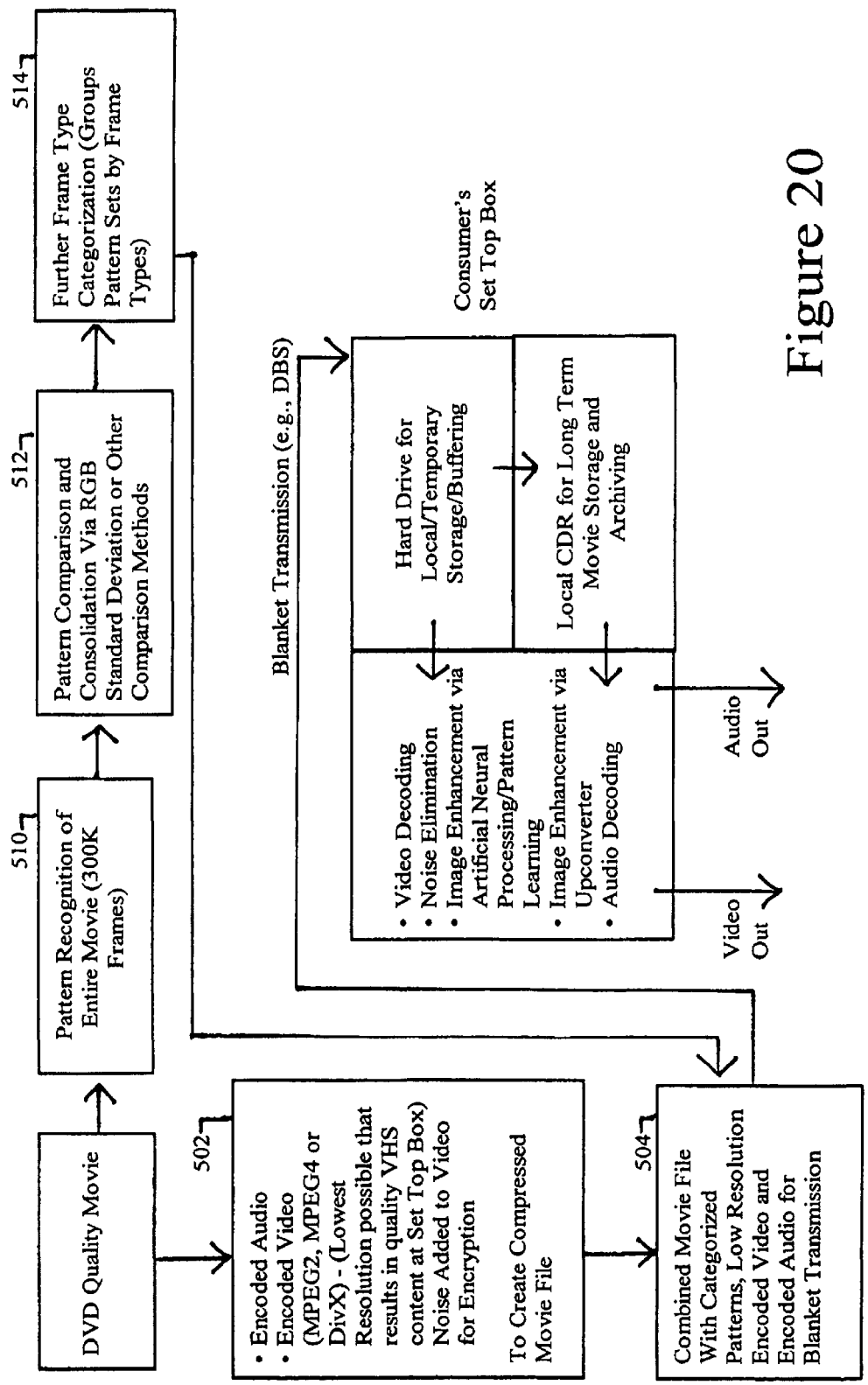
FIG. 20 is a schematic representation of another embodiment similar to that of FIG. 18 with the additional feature that the video portion of the movie is transmitted with a uniform pattern of added noise that is used as copy protection encryption. The noise is removed by the processor in the set top box, as the processor is also enhancing the image.

Video Encryption Utilizing ZISC Noise Reduction (FIG. 20)

The embodiment of FIG. 18 can be further enhanced by adding noise to the transmitted video as a type of copy protection, with the noise being capable of removal by the ZISC processor. This noise is added based upon the premise that, at some point, the quality of the transmitted video content is so poor that it is not worth duplicating or copying the digital source. In preferred embodiments (FIG. 20), a uniform pattern of noise is added to each frame of the movie. To enable the best enhancement by the ZISC processor at the set top box, preferably care is taken to restrict the character and the location of the noise to specific areas of the video frames so that noise reduction and removal by the ZISC processor is optimized. (Obviously, noise will not be used to distort the transmitted DNA library.) Coordination between noise distribution and initial pattern recognition points assure that the associated category pixels of the degraded video are not changed by added noise. Another benefit to adding the noise in the form of uniform noise from frame to frame is the additional compression ratios that can be achieved due to identical pixels throughout the entire video.

Ensuring Flawless Movie Recordings Using Checksums and Multiple Downloads

Satellite receivers do not have perfect reception due to the tradeoff between electrical power and bandwidth of the satellite. Weather conditions, motion of atmosphere layers or obstructions between the dish and the satellite may interrupt the signal. A momentary loss of bits will cause a video image to freeze for a frame or two, while longer interruptions will cause reception to blank. Whereas a short loss in video is a couple of frozen frames, data loss in audio may leave a glaring blank. Therefore, a satellite system for transmission of movies and/or music preferably should include a method to detect and fix data losses at the receiver.

Patching data "potholes" requires a method for sensing potholes and another for placing "asphalt" to fill them. Typically, digital data is sent in packets of bits (perhaps one thousand bits at a time with each packet containing $\frac{1}{40}$ second of music). Loss of bits within a packet can be detected by error codes or merely a "checksum" at the end of the packet which indicates the sum of all the sent bits. Each packet may have an identifying number so that loss of an entire packet is noticed. This is all conventional Internet technology.

Repairing data loss might be accomplished by replacing an occasional packet by the receiver asking for a copy of the packet via an Internet or modem phone connection. However, the frequency of data loss and amount of contiguous data might be lost (for instance, during a rainstorm), requires a wider bandwidth, like the satellite, to provide the material to repair data loss.

Therefore, in certain embodiments, the present invention provides the capability in the system to detect bit losses and receive a second copy of the selection and use all or part of that copy to patch the missing or corrupted bits or packets in the original download. This would require storing a requested download on the storage medium (e.g., hard drive), checking for missing data, informing the customer that the download was imperfect, then receiving and storing all or part of a second (or rarely a third) transmission, and then selecting good packets of bits to make up the final copy.

In practice, a customer selects a movie or music selection via the TV-remote interface and the TV screen notes a download, say, 45 minutes later. As soon as the download is completed, the customer is informed of the quality of the download (A, B, C, D) and informed of the time of the next transmission of the material. The customer has the option of viewing the less-than-perfect movie, or even burn a CD if they wish. Or the customer can wait for a better version.

While the present invention has been described in connection with certain illustrated embodiments, it will be appreciated that modifications may be made without departing from the true spirit and scope of the invention. For example, the term "video display device" has been used herein in its broadest sense to refer to any suitable video imaging system, such as a television, computer monitor, plasma screen, LED display, liquid crystal display, 3D imaging system, or the like, understanding that an appropriate audio capability is provided. Also, while a DVD RAM platter system has been described as one preferred recording and playback device, both at real time and time-compressed transmission speeds and write speeds to the discs, other systems may be used, alone or in combination, such as magneto-optical disc, digital tape, VHS tape, a central or auxiliary server (optical, magnetic or magneto-optical). The discrete storage media of any one of these alternative devices may be arranged in a platter or stack or other suitable format to provide the user access to multiple stored audio/video content stored thereon. These and other modifications are deemed to be within the true spirit and scope of the invention.

That which is claimed:

1. A method of distributing a video to a customer device, comprising:
    converting the video to a protected form, wherein the video comprises a plurality of video frames at a pixel size defined by a first number of horizontal pixels and a second number of vertical pixels, wherein converting the video to a protected form comprises:
        converting the plurality of video frames to a plurality of low resolution video frames, wherein each of the plurality of low resolution video frames has a size that is the same as the pixel size of the plurality of video frames, and wherein each of the plurality of low resolution video frames comprises one of the plurality of video frames at a fraction of the pixel size and a single color in the area outside of the one of the plurality of video frames at the fraction of the pixel size, and
        encoding the plurality of low resolution video frames;
    transmitting the video in the protected form to the customer device, wherein the customer device is configured to:
        record the video in the protected form in which it is transmitted,
        decode the encoded plurality of low resolution video frames,
        increase the size of the decoded plurality of video frames from the fraction of the pixel size to the pixel size, and
        output the video for playback at the pixel size;
    receiving video playback information from the customer device at a central controller system; and billing for output of the video for playback at the pixel size by the customer device.

2. The method of claim 1 wherein the transmitting is carried out by direct broadcast satellite transmission.

3. The method of claim 1 wherein increasing the size of the plurality of video frames is achieved by upconverting to increase a pixelization rate.

4. The method of claim 3 wherein upconverting includes performing a three-dimensional spatial/temporal interpolation that performs real time de-interlacing and frame rate upconversion.

5. The method of claim 1 wherein increasing the size of the plurality of video frames is achieved by artificial neural processing incorporating pattern learning.

6. The method of claim 5 wherein the artificial neural processing is facilitated by zero instruction set computing.

7. The method of claim 5, further comprising:
employing a digital neural archive pattern library for the video; and
transmitting the pattern library along with the video.

8. The method of claim 5, wherein the customer device is further configured to store a pattern library.

9. The method of claim 5, wherein:
converting the video to a protected form further comprises adding noise to the video in the protected form prior to transmitting; and
the customer device is further configured to removing the noise from the video in the protected form.

10. The method of claim 9 wherein adding noise comprises adding uniform patterns of noise to at least selected ones of the plurality of video frames.

11. The method of claim 1 wherein increasing the size of the plurality of video frames is achieved by artificial neural processing incorporating pattern learning followed by upconversion to increase a pixelization rate.

12. The method of claim 1, wherein the fraction of the pixel size is approximately one quarter of the pixel size.

13. The method of claim 1, wherein the single color in the area outside of the one of the plurality of video frames at the fraction of the pixel size is black.

14. A system for receiving a video at a customer location, the system comprising:
a receiver at the customer location configured to receive the video in a protected form, wherein the video comprises a plurality of video frames at a pixel size defined by a first number of horizontal pixels and a second number of vertical pixels, wherein converting the video to a protected form comprises:
converting the plurality of video frames to a plurality of low resolution video frames, wherein each of the plurality of low resolution video frames has a size that is the same as the pixel size of the plurality of video frames, and wherein each of the plurality of low resolution video frames comprises one of the plurality of video frames at a fraction of the pixel size and a single color in the area outside of the one of the plurality of video frames at the fraction of the pixel size, and
encoding the plurality of low resolution video frames;
a digital recording device configured to store the video in the protected form;
a decoder configured to decode the plurality of low resolution video frames;
an image enhancer configured to increase the size of the decoded plurality of video frames from the fraction of the pixel size to the pixel size;
an output configured to output the video for play back at the pixel size; and
a communications mechanism configured to communicate with a central controller system to verify to the controller system that the video has been outputted for play back.

15. The system of claim 14 wherein said image enhancer comprises an upconverter that is configured to utilize three-dimensional spatial/temporal interpolation to perform real time de-interlacing and frame rate upconversion.

16. The system of claim 14 wherein said image enhancer comprises a hardware implementation of artificial neural networks.

17. The system of claim 16, wherein the hardware implementation comprises a zero instruction set computer.

18. The system of claim 14, wherein the fraction of the pixel size is approximately one quarter of the pixel size.

19. The system of claim 14, wherein the single color in the area outside of the one of the plurality of video frames at the fraction of the pixel size is black.

20. A method of converting a video to a protected form, wherein the video comprises a plurality of video frames at a pixel size defined by a first number of horizontal pixels and a second number of vertical pixels, the method comprising:
converting, by one or more computing devices, the plurality of video frames to a plurality of low resolution video frames, wherein each of the plurality of low resolution video frames has a size that is the same as the pixel size of the plurality of video frames, and wherein each of the plurality of low resolution video frames comprises one of the plurality of video frames at a fraction of the pixel size and a single color in the area outside of the one of the plurality of video frames at the fraction of the pixel size; and
encoding, by the one or more computing devices, the plurality of low resolution video frames.

21. The method of claim 20, wherein the fraction of the pixel size is approximately one quarter of the pixel size.

22. The method of claim 20, wherein the single color in the area outside of the one of the plurality of video frames at the fraction of the pixel size is black.

* * * * *